US011873677B2

(12) United States Patent
Siller

(10) Patent No.: US 11,873,677 B2
(45) Date of Patent: Jan. 16, 2024

(54) FENESTRATION SYSTEM WITH ACTUATABLE SEALING DEVICE, AND RELATED DEVICES, SYSTEMS, AND METHODS

(71) Applicant: Westhampton Architectural Glass, Inc., Speonk, NY (US)

(72) Inventor: Paul T. Siller, Remsenburg, NY (US)

(73) Assignee: Westhampton Architectural Glass, Inc., Speonk, NY (US)

( * ) Notice: Subject to any disclaimer, the term of this patent is extended or adjusted under 35 U.S.C. 154(b) by 87 days.

(21) Appl. No.: 17/487,087

(22) Filed: Sep. 28, 2021

(65) Prior Publication Data

US 2023/0094996 A1 Mar. 30, 2023

(51) Int. Cl.

| | |
|---|---|
| ***E06B 7/20*** | (2006.01) |
| ***E06B 3/46*** | (2006.01) |
| ***E06B 3/44*** | (2006.01) |
| *E06B 3/96* | (2006.01) |

(52) U.S. Cl.
CPC .................. *E06B 7/20* (2013.01); *E06B 3/44* (2013.01); *E06B 3/4636* (2013.01); *E06B 3/96* (2013.01)

(58) Field of Classification Search
CPC ............................... E06B 7/202; E06B 7/2309
See application file for complete search history.

(56) References Cited

U.S. PATENT DOCUMENTS

| | | | | |
|---|---|---|---|---|
| 3,604,152 A * | 9/1971 | Protzman | E06B 7/2316 49/470 |
| 4,702,038 A * | 10/1987 | Frey | E06B 7/18 49/470 |
| 4,703,586 A | 11/1987 | Smith et al. | |
| 4,947,584 A | 8/1990 | Wexler | |
| 6,125,584 A | 10/2000 | Sanders | |
| 10,024,100 B2 | 7/2018 | Meng | |
| 2002/0093145 A1* | 7/2002 | Caldiroli | E06B 7/14 277/629 |
| 2006/0101719 A1* | 5/2006 | Purlee | E06B 7/2316 49/470 |
| 2007/0022663 A1 | 2/2007 | Faflek et al. | |

(Continued)

FOREIGN PATENT DOCUMENTS

| | | |
|---|---|---|
| DE | 202012100752 U1 | 6/2013 |
| EP | 0451732 A2 | 10/1992 |
| JP | 2000192754 A * | 7/2000 |

*Primary Examiner* — Marcus Menezes
(74) *Attorney, Agent, or Firm* — JONES ROBB, PLLC

(57) ABSTRACT

A fenestration system includes a closure element, a carrier, a weather strip, and an actuator. The closure element has a first support and a second support extending perpendicular to each other, the closure element movable in translation relative to a frame along a longitudinal dimension of the first support between an open position and a closed position. The frame is configured to surround a fenestration opening. The carrier is mounted to the second support and movable along a longitudinal dimension of the second support between an extended position and a retracted position. The weather strip is attached to the carrier and arranged to contact the frame when the carrier is in the extended position. The actuator moves the carrier into the retracted position when the closure element is in the open position and moves the carrier into the extended position when the closure element is in the closed position.

22 Claims, 12 Drawing Sheets

(56) References Cited

U.S. PATENT DOCUMENTS

| | | | | |
|---|---|---|---|---|
| 2016/0075348 | A1* | 3/2016 | Kim | B61D 19/005 105/343 |
| 2018/0291673 | A1 | 10/2018 | Dintheer et al. | |
| 2019/0330916 | A1* | 10/2019 | Mitchell | E06B 7/2316 |

* cited by examiner

FENESTRATION SYSTEM WITH ACTUATABLE SEALING DEVICE, AND RELATED DEVICES, SYSTEMS, AND METHODS

FIELD

Aspects of this disclosure relate generally to fenestration systems (e.g., doors, windows, etc.), and more specifically to fenestration systems having a slidable closure element (e.g., slidable door panel/leaf, slidable window panel/sash, etc.). Related devices, systems, and methods also are disclosed.

INTRODUCTION

Fenestration refers to the art of providing for structures to cover openings in a building structure, including but not limited to in houses, office buildings, multi-dwelling buildings, etc. As used herein, a fenestration system refers to a system that closes an opening in a building, with doors and windows being two non-limiting examples of such fenestration systems. In some cases, a fenestration system may have a movable closure element (e.g., door panels/leaves, window sashes) to allow for selective opening and closing of the opening. A fenestration system will also generally comprise a frame which is arranged around a perimeter of the opening, one or more closure elements movably coupled to the frame, weather sealing devices, and hardware (e.g., latches, locks, etc.).

Some fenestration systems have slidable closure elements (e.g., sliding doors) that are movable in translation and a sliding manner relative to the frame. In such fenestration systems, there are usually two or more of the closure elements, with at least one of the closure elements being movable relative to the other between a position in which the closure elements are approximately side-by-side to close the opening to a position in which the closure elements overlap each other to some extent to open the opening. Each closure element generally comprises two vertical supports, referred to as stiles, coupled to two or more horizontal supports, referred to as rails, to form a rectangular support structure, with a panel held between the stiles and rails. Panels can be made of a variety of materials, such glass, metal, etc. Various weather sealing devices (e.g., weather strips) may be arranged between various parts of the fenestration system to prevent or reduce transfer of air, water, insects, dust, and/or other substances between an environment on one side of the opening (e.g., outside environment) and an environment on an opposite side of the opening (e.g., inside environment). The portions of the closure elements that are adjacent to the frame are generally sealed relative to the frame using weather strips or other sealing members positioned between the frame and the closure elements. In addition, in some systems an interlock mechanism is used to provide a seal between adjacent stiles of two closure elements. The interlock is part of or attached to the stile and extends vertically along a height of the closure element. The interlock of one closure element is complementary to and configured to interact with the interlock of an adjacent closure element when the two closure elements are in the closed position to create a vertical seal.

The above-described sealing devices for slidable closure elements generally provide seals that extend horizontally along the rails (e.g., along the x-axis in FIGS. 1A-1C) and vertically along the stiles (e.g., along the z-axis in FIGS. 1A-1C). However, such horizontal and vertical seals do not always adequately seal the fenestration opening. In fenestration systems with sliding closure elements (e.g., sliding doors), the closure elements are generally offset or stacked relative to one another along a thickness dimension to allow the closure elements to slide relative to one another. Thus, at the corners of the closure element where top and bottom rails meet the interlock, edges of the closure element that extend along the thickness dimension of the closure element may be exposed to an outside environment. The aforementioned thickness dimension is transverse to the longitudinal dimension of the rails and transvers to the longitudinal dimension of the stiles (e.g., the y-axis in FIGS. 1A-1C). A gap can exist between these thickness-dimension edges of the closure element and the frame. Such a gap may provide a route for air, water, insects, dust, and/or other substances to penetrate through the fenestration system. Thus, a need exists to improve sealing for fenestration systems with slidable closure elements, particularly in relation to the aforementioned gaps at the corners of the closure element which extend along the thickness dimension of the closure element.

SUMMARY

Embodiments of the present disclosure may solve one or more of the above-mentioned problems and/or may demonstrate one or more of the above-mentioned desirable features. Other features and/or advantages may become apparent from the description that follows.

In accordance with at least one embodiment of the present disclosure, a fenestration system may comprise a closure element, such as a door or window. The closure element is movable relative to a frame between an open position and a closed position. The frame surrounds a fenestration opening, such as a doorway, in a building structure. The fenestration system may also comprise a carrier mounted to the closure element and movable relative to the closure element between an extended position and a retracted position. A weather strip is attached to the carrier and arranged to contact the frame in the extended position of the carrier. One or more retraction magnets may be arranged to exert a first magnetic force on the carrier to move the carrier into the retracted position in the open position of the closure element. One or more extension magnets may be arranged to exert a second magnetic force on the carrier to move the carrier into the extended position in the closed position of the closure element.

In accordance with at least one embodiment of the present disclosure, a fenestration system may comprise a closure element comprising a first support and a second support extending perpendicular to each other. The closure element may be movable in translation relative to a frame along a longitudinal dimension of the first support, the frame configured to surround a fenestration opening between an open position and a closed position. A carrier may be mounted to the second support and movable along a longitudinal dimension of the second support between an extended position and a retracted position. A weather strip may be attached to the carrier and arranged to contact the frame when the carrier is in the extended position. An actuator may be configured to move the carrier into the retracted position in the open position of the closure element and configured to move the carrier into the extended position in the closed position of the closure element.

In accordance with at least one embodiment of the present disclosure, a method of operating a fenestration system may comprise, in response to a closure element of the fenestration system being moved to a closed position, magnetically actuating a carrier mounted to the closure element to an extended position relative to the closure element. The method may further comprise, in response to the closure element being moved to an open position, magnetically actuating the carrier to a retracted position relative to the closure element. A weather strip is attached to the carrier and may be in contact with a frame of the fenestration system in the extended position of the carrier and spaced from the frame in the retracted position of the carrier.

In accordance with at least one embodiment of the present disclosure, a method of manufacturing a fenestration system may comprise mounting a carrier to a closure element such that the carrier is movable relative to the closure element between an extended position and a retracted position. The method may further comprise mounting one or more retraction magnets to the closure element such that the one or more retraction magnets exert a first magnetic force on the carrier to move the carrier into the retracted position in an open position of the closure element. The method may further comprise mounting one or more extension magnets to a frame of the fenestration system such that the one or more extension magnets exert a second magnetic force on the carrier to move the carrier into the extended position in a closed position of the closure element. A weather strip is attached to the carrier and may be in contact with the frame in the extended position of the carrier and spaced from the frame in the retracted position of the carrier.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more embodiments of the present teachings and together with the description explain certain principles and operation. In the drawings.

DETAILED DESCRIPTION

Figure 1A:
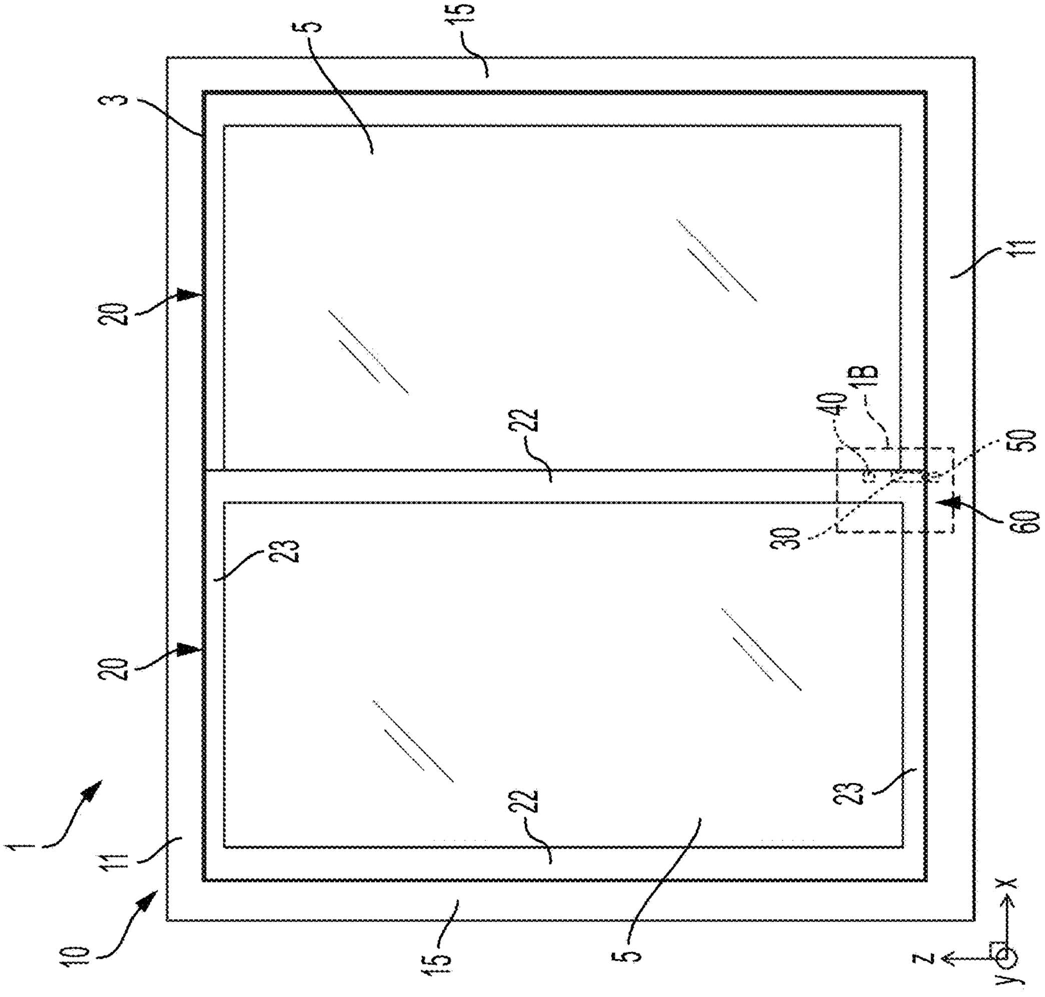
FIG. 1A is a schematic plan view of a fenestration system in a closed state according to an embodiment of the present disclosure.

As noted above, in fenestration systems with sliding closure elements, edges of the closure element that extend along a thickness dimension of the closure element at the corners thereof adjacent the interlock may be exposed to the outside environment, and the gap between these edges and the frame may provide a route for air, water, insects, dust, and/or other substances to penetrate through the fenestration system. One approach to preventing such undesired leakage through this gap is to provide a sealing member, such as a weather strip or other similar gasket, that extends in the thickness dimension (e.g., y-axis direction in FIGS. 1A-1C) and is positioned between the thickness-dimension edge of the closure element and the frame. The sealing member can be fixed relative to the closure element or the frame and interacts with the closure element and the frame to create a seal to prevent or reduce the passage of substances through the aforementioned gap. However, one issue with this approach is that when the closure element is moved to open or close the fenestration system, the sealing member can rub against the frame (if the sealing member is fixed to the closure element) or rubs against the closure element (if the sealing member is fixed to the frame). This rubbing of the sealing member against the frame or closure element can be a substantial source of friction that resists the movement of the closure element, thus substantially increasing the force a user must exert to open or close the closure element. Moreover, the rubbing of the sealing member against the frame or closure element imparts wear on the seal, which can damage the sealing member and reduce its effectiveness.

Embodiments disclosed herein address the above-noted issues by providing the closure element with an actuatable sealing device that has a seal extending across a thickness dimension of the closure element at one or more corners of the closure element near an interlock. In some embodiments, the actuatable sealing device is actuated by magnets, as described in greater detail below. In some embodiments, one of more springs may be used in conjunction with or in lieu of the magnets to actuate the sealing device.

The actuatable sealing device comprises a weather strip attached to a carrier, with the carrier being movable between an extended (sealing) position in which the weather strip creates at least a partial seal between the closure element and the frame and a retracted (non-sealing) position. The term "weather strip" as used herein is intended to refer generically to any sealing device for use in sealing around edges of closure elements and is not limited to any one specific type of sealing device. Other terms that are sometimes used in the art for a weather strip include gasket and flexible seal. Various examples of weather strips are described in greater detail below. The carrier is arranged to be moved between the extended and retracted positions by actuation elements. such as magnets that exert a magnetic attraction force on the carrier. The actuation elements are arranged such that they force the carrier into the extended (sealing) position when the closure element is in the closed position relative to the fenestration opening, and they force the carrier into the retracted (non-sealing) position when the closure element is moved away from the closed position to an open position relative to the fenestration opening. In some embodiments the weather strip extends in a direction parallel to the thickness dimension of the closure element, so that the weather seal at least partially seals the above-described gap between the frame and the thickness dimension edge of the closure element. Thus, the above-described penetration of undesired substances via the gap can be prevented or mitigated. Moreover, because the carrier is forced into the retracted position upon the closure element being moved away from the closed position, the weather strip does not rub against the frame as the closure element is being opened or closed, thus avoiding the above-described friction and wear.

In various embodiments, the carrier is magnetically actuated to move between extended and retracted positions relative to the closure element. Such actuation occurs by magnetic attraction forces from one or more magnets. In some embodiments, a first set of one or more magnets is attached to the frame at a position that is near to a position of the carrier when the closure element is in the closed position, such that when the closure element is in the closed position the first set of magnets exerts a magnetic attraction force on the carrier urging the carrier toward the extended position. The one or more magnets of this set may be referred to hereinafter as "extension magnets" because they urge the carrier toward the extended position. A second set of one or more magnets is attached to the closure element near the carrier so as to exert a magnetic attraction force on the carrier that urges the carrier toward the retracted position. The one or more magnets of this set may be referred to hereinafter as "retraction magnets" because they urge the carrier towards the retracted position. The extension and retraction magnets are arranged such that, when the closure element is in the closed position, the force exerted by the set of extension magnets is strong enough to overcome any countervailing forces, including the magnetic force exerted by the set of retraction magnets, thus forcing movement of the carrier into the extended position. However, as the closure element is moved away from the closed position, the magnitude of the magnetic force exerted by the extension magnets on the carrier decreases to a level sufficient for the retraction magnets to exert a stronger magnetic attraction force on the closure element than the extension magnets. Thus, when the closure element has been moved some distance away from the closed position, the magnetic attraction force of the retraction magnet set overcomes any countervailing forces such that the carrier is pulled into the retracted position. In some embodiments, a third set of one or more magnets is attached to the carrier, and the third set of one or more magnets magnetically interacts with the extension magnet set and the retraction magnet set to generate the above-described magnetic attraction force that urge the third set of one or more magnets (and hence the carrier to which they are attached) toward the extended and retracted positions, respectively.

The above-described magnetic actuation of the carrier allows for the carrier to be moved automatically between the extended and retracted positions based on the position of the closure element without requiring manual intervention to actuate the carrier. Moreover, the magnetic actuation of the carrier, as opposed to mechanical actuation of the carrier via a mechanical linkage or the like, may allow for the sealing device to have fewer moving parts, be more compact, have less complexity, generate less friction, and experience less wear (and hence have increased reliability and lifespan).

Figure 1B:
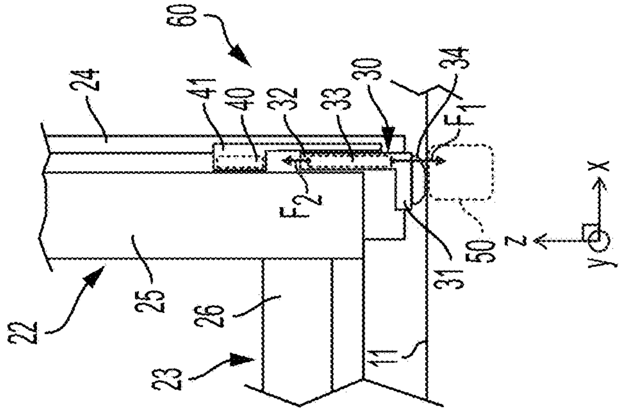
FIG. 1B is a detailed view of portion 1B of FIG. 1A, with part of a stile being transparent to show interior components of the fenestration system.
Figure 1C:
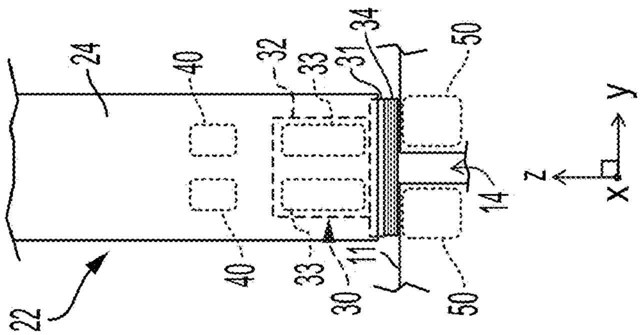
FIG. 1C is a front end view of portion 1B of FIG. 1A.
Figure 2C:
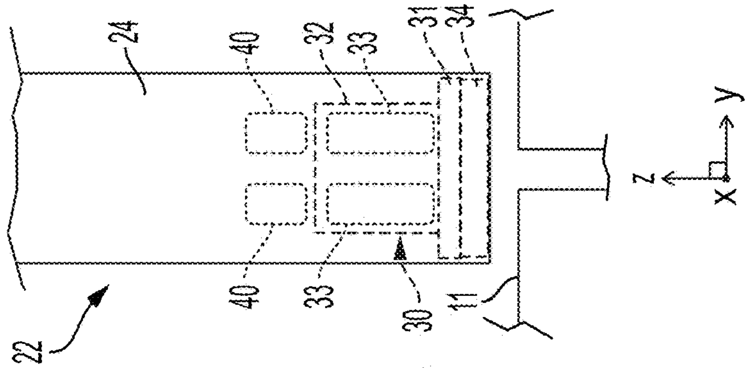
FIG. 2C is a front end view of portion 2B of FIG. 2A.

Turning now to FIGS. 1A-2C, an embodiment of a fenestration system 1 is schematically illustrated will be described in greater detail. FIGS. 1A-1C illustrate the fenestration system 1 in a closed state, while FIGS. 2A-2C illustrate the fenestration system 1 in an open state. Portions of the system have been omitted or made transparent in FIGS. 1B and 2B to show parts that would otherwise be hidden. In FIGS. 1A-2C, some parts that would otherwise be obscured in the view are depicted with dashed lines. As shown in FIG. 1A, the fenestration system 1 comprises a frame 10 surrounding an opening 3 covered by two or more closure elements 20 coupled to the frame, and a magnetically actuatable sealing device 60. These components of the fenestration system 1 are described in greater detail in turn below.

Figure 2B:
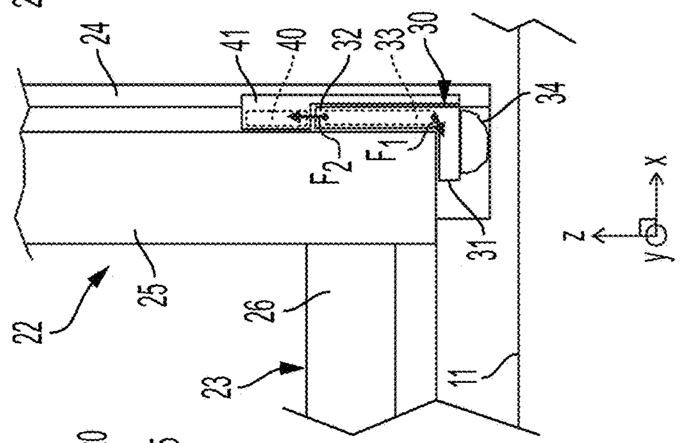
FIG. 2B is a detailed view of portion 2B in FIG. 2A, with part of a stile being transparent to show interior components of the fenestration system.
Figure 2A:
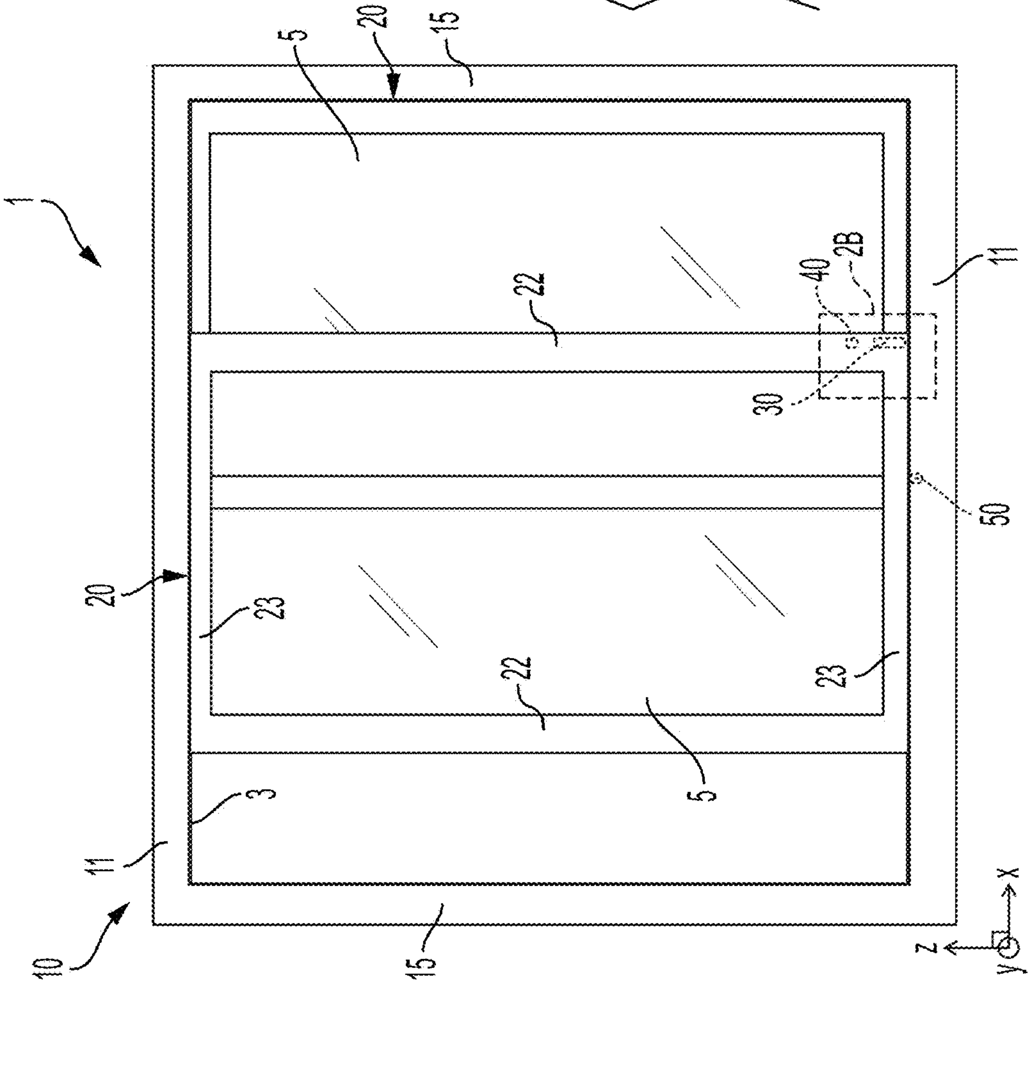
FIG. 2A is a schematic plan view of the fenestration system of FIG. 1A in a closed state.

The frame 10 comprises horizontal portions 11 and vertical portions 15 arranged around a perimeter of an opening 3 (e.g., a doorway) in a structure (e.g., exterior wall of a building structure). A horizontal portion 11 positioned at the bottom of the opening 3 may also be referred to as a sill (sometimes also referred to in the art as a threshold) while a horizontal portion 11 positioned at the top of the opening 3 may be referred to as a header. The vertical portions 15 may also be referred to as jambs (sometimes also referred to in the art as posts). The frame 10 holds the closure elements 20, with one, some, or all of the closure elements 20 being movable in translation relative to the frame 10. In FIGS. 1A and 2A, the direction of motion of the closure elements 20 is parallel to the x-axis, which is parallel to the longitudinal dimension of the horizontal portions 11. The frame 10 may also comprise structural features to hold the closure elements and/or facilitate their motion (e.g., rails), hardware (e.g., latches), weather stripping, and other known components. A person of ordinary skill in the art would be familiar with the hardware and other structural features and components of a frame, and thus illustration and description thereof is omitted herein.

As illustrated in FIGS. 1C and 2C, the horizontal portion 11 forming the sill of the frame 10 is illustrated as having a channel 14 running along the x-axis direction below the closure element 20. In such an embodiment, supports (not illustrated) may extend through the channel 14 to attach the closure element 20 to bearing devices (e.g., wheels) that are housed below the top surface of the horizontal portion 11. A specific example of such an embodiment is described in greater detail below with reference to FIGS. 9A-9C. In other embodiments, a channel is not necessarily provided in the horizontal portion 11 that forms the sill. Instead, for example, bearing devices may be positioned between the top surface of the sill horizontal portion 11 and the rail 23, described further below, of the closure element 20, or the closure element 20 may rest directly against the sill horizontal portion 11 without any bearing devices.

As mentioned above, the closure elements 20 are structures such as door panels or leaves, window sashes, or the like that are held by the frame 10. FIGS. 1A and 2A illustrate two closure elements 20, but any number of closure elements 20 may be included in a fenestration system 1, with sealing devices that operate to seal adjacent pairs of closure elements. In a closed configuration of the fenestration system 1, as illustrated in FIG. 1A, each of the closure elements 20 is located at a closed position, and in this configuration the closure elements 20 form a barrier that substantially closes the opening. In an open configuration of the fenestration system 1, as illustrated in FIG. 2A, at least one of the closure elements 20 has been moved (e.g., along the x-axis in FIGS. 1A and 1B) away from its closed position to an open position in which the opening 3 is at least partially uncovered by the closure elements 20.

As described above and as shown in FIG. 1A, each closure element 20 comprises supports 22, 23 coupled at right angles to form a rectangular support structure, with a panel 5, which can be solid body or multiple members, held between the supports 22 and 23. The supports 22 and 23 comprise two or more horizontal supports (rails) 23 and two or more vertical supports (stiles) 22. The supports 22 and 23 may be referred herein to as “stiles” and “rails” when their orientation is being specified and as “supports” (e.g., first support, second support) when their orientation is not specified. In various embodiments, the panels 5 may be or comprise a glass pane, wood, metal, or other material. As shown in FIG. 1B, a rail 23 may comprise a support structure 26, such as an extruded or pultruded aluminum support structure, wood support structure, vinyl support structure, or the like. The rail 23 may also comprise additional components (not illustrated), such as facial elements (e.g., decorative elements to cover, hide, or otherwise improve the aesthetic appearance of the support structure 26) mounted on the support structure 26. Similarly, as illustrated in FIG. 1B, a stile 22 may comprise a support structure 25 (which may be similar to support structure 26), as well as additional components (not illustrated) such as facial elements. As shown in FIG. 1B, one of the stiles 22 of a closure element 20 may also comprise an interlock feature 24 (see FIGS. 1B, 1C, 2B, 2C), which is attached to the support structure 25 and configured to interact with a complementary interlock feature 24 of a stile 22 of an adjacent closure element 20 to create a vertical seal between the stiles 22 of the two closure elements 20 when they are in their closed positions. For example, FIG. 8, described in greater detail below, illustrates two interlock features 324_1 and 324_2 interacting to create a vertical seal. A person of ordinary skill in the art would be familiar with various types of interlocks provided by complementary interlock features between two closure elements of a fenestration system, and thus the interlock features 24 are not described in greater detail herein. The closure elements 20 may have additional components, such as additional horizontal supports between the top and bottom rails 23, mullions, hardware, etc., as would be familiar to those of ordinary skill in the art. Wheels or other bearings may be used to movably couple the closure elements 20 to the frame 10 to reduce the force needed to move the closure elements 20, as would be familiar to those of ordinary skill in the art. Movement of the closure elements 20 may be constrained and guided by rails or other structures of the frame 10 that engage the closure elements 20.

At least one of the closure elements 20 has at least one corresponding magnetically actuatable seal device 60 to create a seal at a corner of the closure element 20 near the interlock feature 24. In FIGS. 1A and 2A, a magnetically actuatable seal device 60 is illustrated at a bottom corner of a closure element 20, but in practice the magnetically actuatable seal device 60 could instead be provided at a top corner or magnetically actuatable seal devices 60 could be provided for both top and bottom corners. Moreover, although a magnetically actuatable seal device 60 is shown for only one of the closure elements 20 in FIGS. 1A-2C, magnetically actuatable seal devices 60 could be provided for one, some, or all of the closure elements 20.

As shown in FIG. 1A, the magnetically actuatable seal device 60 comprises a carrier 30, a set of one or more extension magnets 50, and a set of one or more retraction magnets 40. The carrier 30 is attached to one of the closure elements 20 and moveable relative to the closure element 20 along the z-axis direction that is perpendicular to a direction of motion of the closure element 20 (x-axis direction) and perpendicular to the thickness dimension (y-axis direction) of the closure element 20. (As used herein, when referring to an x-, y-, or z-axis direction, the motion encompasses motion that can occur in both the positive and negative directions of those axes, one at a time, unless otherwise specified). In other words, the carrier 30 moves along a direction parallel to a longitudinal axis of the stile 22. The carrier 30 is moved between extended and retracted positions relative to the closure element 20, respectively, by the set of one or more extension magnets 50 and the set of one or more retraction magnets 40, based on a position of the closure element 20. FIGS. 1A-1C illustrate the carrier 30 in the extended position (corresponding to a closed state of the fenestration system 1), and FIGS. 2A-2C illustrate the carrier 30 in the retracted position (corresponding to an open state of the fenestration system 1). As described in greater detail below, the sets of retraction and extension magnets 40 and 50 are arranged such that they force the carrier 30 into the extended position when the closure element 20 is in the closed position shown in FIG. 1A and they force the carrier 30 into the retracted position when the closure element 20 is in an open position as shown in FIG. 2A.

A weather strip 34 is attached to the carrier 30, as shown in FIG. 1B. As shown in FIGS. 1B and 1C, when the carrier 30 is in the extended position, the weather strip 34 contacts a horizontal portion 11 the frame 10 (e.g., a sill horizontal portion 11 of the frame 10 in the illustrated embodiment) and creates at least a partial seal between the closure element 20 and the frame 10. The contact between the weather strip 34 and the frame 10 may deform the weather strip 34 to allow for a better seal. As shown in FIGS. 2B and 2C, when the carrier 30 is in the retracted position, the weather strip 34 is spaced apart from the frame 10. In the illustrated embodiment, the weather strip 34 extends along the thickness dimension of the closure element 20, which is the y-axis direction in FIGS. 1A-2C. Thus, the weather strip 34 at least partially seals the above-described gap(s) between the frame 10 and the thickness dimension edge of the closure element 20. The weather strip 34 comprise, for example, a compliant (deformable) material, such as foam, rubber, vinyl, felt (e.g., made from wool, cotton, polyester, etc.), metal, plastic, a polymer, silicon, an array of aligned natural or synthetic fibers (like a brush), etc. In some embodiments, the weather strip 34 may be any commercially available weather strip, such as a Schuco P-shaped weather strip.

In some embodiments, the carrier 30 is mounted to the stile 22 in a space between the support structure 25 and the interlock feature 24, as shown in FIGS. 1B and 2B. In some embodiments, a carrier guide 41 is also provided between the support structure 25 and the interlock feature 24 to constrain and guide the movement of the carrier 30. Specifically, the carrier 30 may be constrained to move only along one direction of motion, which is the z-axis direction in FIGS. 1A-2C. In addition, the set of one or more retraction magnets 40 may be attached to the carrier guide 41.

In some embodiments, a set of one or more magnets 33 are attached to the carrier 30. The one or more magnets 33 of this set are also referred to herein as carrier magnets 33. The carrier magnets 33 magnetically interact with the extension and retraction magnets 50 and 40 to generate the forces on the carrier 30 that cause the carrier 30 to move between the extended and retracted positions. More specifically, as shown in FIG. 1B, the one or more extension magnets 50 exert a magnetic attraction force $F_1$ on the one or more carrier magnets 33, and because the one or more carrier magnets 33 are coupled to the carrier 30 this magnetic attraction force $F_1$ is translated into a force on the carrier 30 that urges the carrier 30 toward the one or more extension magnets 50 and hence toward the extended position. Similarly, the one or more retraction magnets 40 exert a magnetic attraction force $F_2$ on the one or more carrier magnets 33, which is translated into a force urging the carrier 30 toward the one or more retraction magnets 40 and hence toward the retracted position. In FIGS. 1B and 2B, the forces $F_1$ and $F_2$ are represented schematically by arrows, with the lengths of the arrows indicating generally the relative magnitudes of the forces and the direction of the arrows indicating the directions of the forces. Note that the illustrated force arrows are intended to generally indicate relative strength and direction to facilitate discussion, but are not to-scale and are not intended to indicate relative strength or direction with precision. For example, the magnitude of the force $F_1$ in the state shown in FIG. 2B might be much smaller than is indicated by the length of its arrow in that Figure, but the arrow is made larger in that Figure to allow the direction of the arrow to be more easily perceived. In some embodiments, the carrier 30 may be ferromagnetic and thus may magnetically interact with the retraction and extension magnets 40 and 50 without needing carrier magnets 33. The description below assumes that carrier magnets 33 are present, but the same principles would apply if the carrier 30 were ferromagnetic.

As shown in FIGS. 1B and 2B, the forces $F_1$ and $F_2$ exerted on the carrier 30 by the extension and retraction magnets 50 and 40, respectively, tend to oppose one another. Thus, whether the carrier 30 is moved to the extended position or to the retracted position will depend on the relative magnitudes of the forces $F_1$ and $F_2$. Generally speaking, when the force $F_1$ is sufficiently larger than the force $F_2$ the carrier 30 is pulled to the extended position, and when the force $F_2$ is sufficiently larger than the force $F_1$ the carrier 30 is pulled to the retracted position. The strengths of the forces $F_1$ and $F_2$ depend on the configurations of the magnets 33, 40, and 50 (e.g., their size, constituent materials, etc.) and also on the distances between the magnets 33, 40, and 50 (the strength of a magnetic attraction force between two magnets is roughly proportional to the inverse square of the separation between the magnets). As shown in FIGS. 1A-1C, the one or more extension magnets 50 are attached to the frame 10 at a position that is near to (e.g., immediately below) a position of the carrier 30 when the closure element 20 is in the closed position. Thus, the force $F_1$ has its largest magnitude when the closure element 20 is in the closed position, as shown in FIGS. 1A-1C, because the one or more extension magnets 50 and carrier magnets 33 are relatively close to each other. The magnitude of the force $F_1$ declines as the closure element 20 moves away from the closed position, as shown in FIGS. 2A-2C, because the one or more extension magnets 50 and one or more carrier magnets 33 move farther apart. Furthermore, as the closure element 20 moves away from the closed position, the direction of $F_1$ will also change from pointing vertically downward along the z-axis in the closed position to pointing more obliquely and eventually generally in an x-axis direction, as shown in FIG. 2B. This change in direction of the force $F_1$ results in the z-axis component of $F_1$ becoming a smaller and smaller proportion of the overall force $F_1$, thus further reducing the effective strength with which the force $F_1$ acts in the z-axis direction, which is the direction of motion of the carrier 30. Thus, between the decreasing magnitude of $F_1$ overall and the changing of direction $F_1$, the effective strength with which the force $F_1$ acts on the carrier 30 along the z-axis direction decreases as the closure element 20 moves away from the closed position, with the effective strength of the force $F_1$ on the carrier 30 becoming negligible after a relatively small amount of movement of the closure element 20 toward the open position. In contrast, the one or more retraction magnets 40 are always relatively close to the one or more carrier magnets 33 regardless of the position of the closure element 20, and thus the magnitude of the force $F_2$ stays relatively constant regardless of the position of the closure element 20.

The magnets 33, 40, and 50 are configured such that, in the closed position of the closure element 20, the magnitude of the force $F_1$ is large enough to overcome the force $F_2$, thus forcing the carrier 30 into the extended position. Moreover, the magnets 33, 40, and 50 are configured such that, when the closure element 20 is moved away from the closed position (along an x-axis direction) a small distance, the magnitude of the force $F_1$ drops sufficiently low enough that the force $F_2$ is able overcome the countervailing forces and pull the carrier 30 to the retracted position. Accordingly, by appropriately arranging the locations and relative strengths of the magnets 40 and 50, the carrier 30 can be magnetically actuated between the extended and retracted positions based on whether the closure element 20 is in a closed or an open position.

The foregoing analysis of the motion of the carrier 30 as caused by the magnets 33, 40, and 50 neglects gravity and friction forces, to simplify the discussion. A more thorough explanation taking these into account follows below. The motion of the carrier 30 relative to the closure element 20 is determined by the net force acting on the carrier 30 along the direction of motion of the carrier 30 (i.e., along a z-axis direction in FIGS. 1A-2C). Generally speaking, the net force acting on the carrier 30 is the sum of the forces $F_1$ and $F_2$, as well as gravity and friction. Because the carrier 30 is constrained to motion only along a line (i.e., motion in a z-axis direction), the motion of the carrier 30 is controlled by the component of the net force that acts along that direction, i.e., the z-axis component of the net force. In other words, components of the forces that act in other directions can be ignored for purposes of determining the motion of the carrier 30.

Thus, the carrier 30 will be forced to move in the positive z-axis direction toward the retracted position when the following is true:

$$|F_{2\_z}| \geq |F_{1\_z}| + |F_{gravity\_z}| + |F_{friction\_z}| \quad \text{(Eq. 1).}$$

In equation 1, $F_{gravity\_z}$ is the z-axis component of the force of gravity on the carrier 30, $F_{friction\_z}$ is the z-axis component of the force of friction, $F_{2\_z}$ is the z-axis component of the force exerted by the retraction magnets 40 on the carrier 30, and $F_{1\_z}$ is the z-axis component of the force exerted by the extension magnets 50 on the carrier 30.

Conversely, the carrier 30 will be forced to move in the negative z-axis direction toward the extended position when the following is true:

$$|F_{1\_z}| \geq |F_{2\_z}| - |F_{gravity\_z}| + |F_{friction\_z}| \quad \text{(Eq. 2).}$$

In equations 1 and 2, it is assumed gravity acts in the same general direction as the extension force $F_1$ (i.e., the negative z-axis direction), which is the case in the arrangement illustrated in FIGS. 1A-2C. However, in other arrangements, equations 1 and 2 may need modification. For example, if the magnetically actuated seal device 60 were installed at a top corner of the closure element 20, then the one or more extension magnets 50 would be positioned above the carrier 30 rather than below it and the one or more retraction magnets 40 would be positioned below the carrier 30 rather than above it. Thus, in such an arrangement the force $F_1$ would point in the positive z-axis direction and the force $F_2$ would point in the negative z-axis direction (the opposite of what is illustrated in FIG. 1B). Thus, in such an arrangement, equation 1 would be modified to have a minus sign before the term $|F_{gravity\_z}|$ (as gravity is now aiding the force $F_2$, rather than opposing it) and equation 2 would be modified to have a plus sign before the term $|F_{gravity\_z}|$ (as gravity is now opposing the force $F_1$, rather than aiding it). Moreover, in embodiments in which the direction of motion of the carrier 30 is aligned with some other axis other than the z-axis, then the z-axis components of the forces in equations 1 and 2 may be replaced by the components of the forces acting along whatever axis is aligned with the axis of motion of the carrier 30. Those having ordinary skill in the art would understand the various modifications needed to the equations above depending on the arrangement, orientation, and/or direction of motion of the carrier, the magnets, and the closure elements.

As shown in FIGS. 1B, 1C, 2B, and 2C, the carrier 30 may comprise a strip attachment portion 31 and an engagement portion 32. The strip attachment portion 31 is configured to hold the weather strip 34. In some embodiments, the strip attachment portion 31 extends substantially across the thickness dimension of the closure element 20. The engagement portion 32 may be inserted between the support structure 25 and the carrier guide 41 and engage with the support structure 25 and the carrier guide 41 to movably attach the carrier 30 to the stile 22. In some embodiments, the one or more carrier magnets 33 are disposed in cavities within the engagement portion 32. In some embodiments, the engagement portion 32 comprises one or more surface features (e.g., grooves and/or ridges) that are complementary to surface features of the support structure 25 and/or surface features of the carrier guide 41. These complementary surface features engage one another to constrain movement of the carrier 30 relative to the closure element 20 to movement along a line, i.e., motion in a z-axis direction in FIGS. 1A-2C.

Figure 12A:
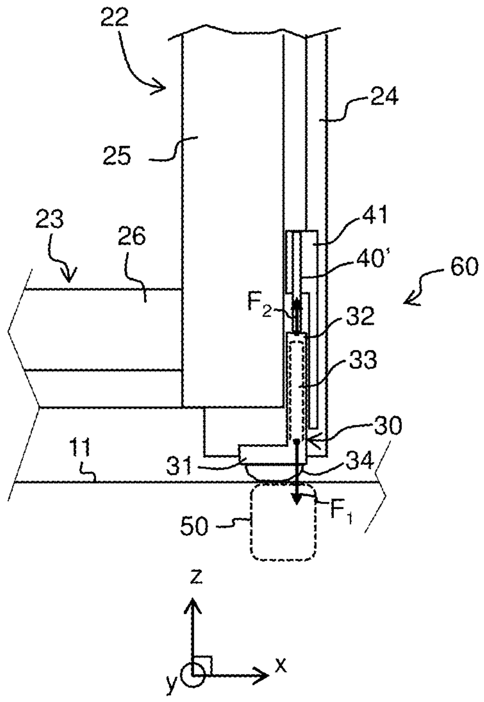
FIG. 12A is a schematic plan view of a portion of a fenestration system in a closed state according to another embodiment of the present disclosure, with part of a stile being transparent to show interior components of the fenestration system.
Figure 12B:
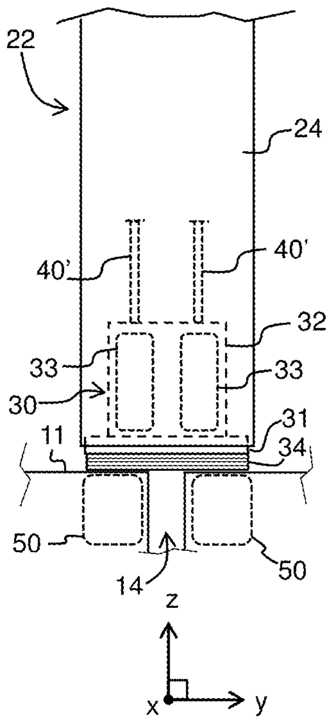
FIG. 12B is a front view of the portion of the fenestration system of FIG. 12A.

In some embodiments, the retraction magnets 40 described above could be replaced with a mechanical biasing element 40', such as a spring, which is attached to the carrier 30 at one end and to the interlock feature 24 or support structure 25 at the other end, as shown in FIGS. 12A and 12B. The biasing element 40' would bias the carrier 30 toward the retracted position. In such a case, the operation of the system would be as described above, except that the force $F_2$ would be a spring force generated by the biasing element 40' rather than a magnetic force. Thus, when the closure element 20 is in an open position the spring force would overcome the magnetic force of the extension magnets 50 and the closure element would be moved to the retracted position, and when the closure element 20 is in the closed position the magnetic force from the extension magnets 50 will overcome the spring force and move the closure element to the extended position.

In some embodiments, instead of the extension magnets, the carrier 30 may be coupled to springs (not illustrated) that bias the carrier 40 towards the extended position. The carrier 30 may be held in the retracted position by a trigger mechanism. The trigger mechanism may be mechanically actuated in response to the closure element 20 being moved to the closed position, for example by coming into contact with a triggering element that is part of or attached to the frame 10, and the actuation of the trigger mechanism may release the carrier 30 such that the springs coupled thereto are allowed to move the carrier 40 into the extended position. A cam element, such as an inclined plane, may be positioned on the frame so as to engage the carrier 40 as the closure element 20 is moved from the closed position to an open position, with the engagement between the cam element and the carrier 40 forcing the carrier 40 to move back into the retracted position and resetting the trigger mechanism to hold the carrier 40. Thus, the carrier 40 is automatically actuated between the extended and retracted positions based on the position of the closure element 20.

Thus, fenestration system 1 described above may prevent or mitigate the above-described penetration of undesired particles via the gaps along the thickness dimension edges of closure elements 20 of the fenestration system 1. Moreover, because the carrier 30 is forced into the retracted position upon the closure element 20 being moved away from the closed position, the weather strip 34 does not rub against the frame 10 as the closure element 20 is being opened or closed, thus avoiding the above-described friction and wear.

Figure 11:
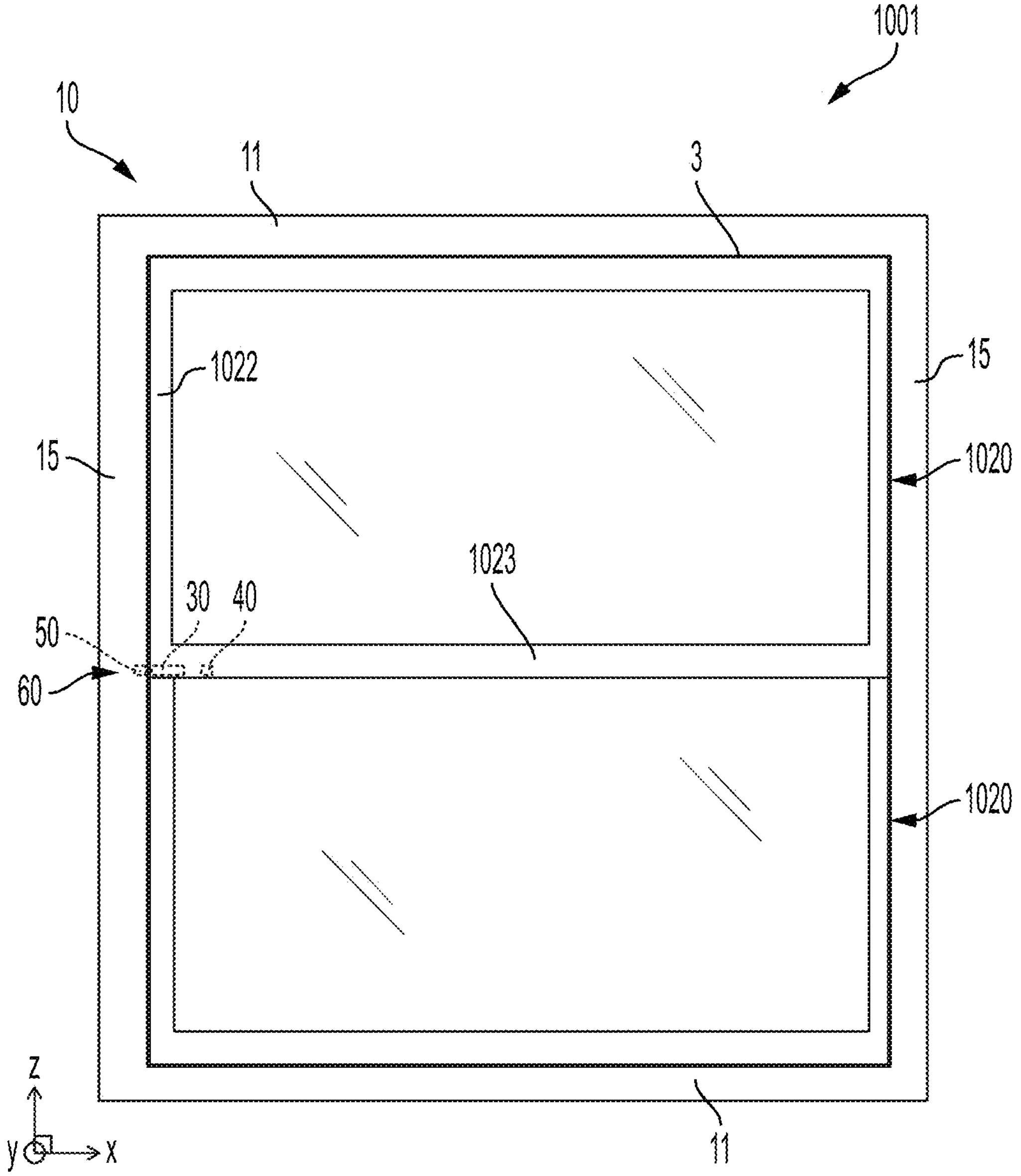
FIG. 11 is a schematic plan view of a fenestration system in a closed state according to another embodiment of the present disclosure.

Further, those having ordinary skill in the art would appreciate, however, that the orientation and direction of motion of the closure elements shown in the embodiments of FIGS. 1 and 2 is nonlimiting and the scope of the present disclosure contemplates other orientations, direction of motion, and arrangements of the closure elements, carriers, and magnets. For example, FIG. 11 illustrates one embodiment of a fenestration system 1001 in which one or both of the closure elements 1020 are translatable in a z-direction and parallel to the vertical portions 15 of the frame 10. The system 1001 has some components that are similar to components of the system 1, and these similar components are given the same reference numerals and duplicative description thereof is omitted. The closure elements 1020 may be similar to the closure elements 20 described above, except that they translate in different directions, namely perpendicular to the translational motion of the closure elements 20. Thus, the vertical supports 22 and horizontal supports 23 in the embodiment of FIGS. 1 and 2 would instead become horizontal supports 1022 and vertical supports 1023, respectively, in the embodiment of FIG. 11. In the system 1001, the magnetically actuatable sealing device 60 may be relocated to be adjacent to a vertical portion 15 of the frame 10, as shown in FIG. 11. Those of ordinary skill in the art would appreciate how fenestration system 1001 operates based on the description of the embodiment of FIGS. 1 and 2 above. Further, it should be appreciated that the embodiment of FIG. 11 can include the various structures for similar parts described below with reference to the embodiments of FIGS. 3A-8, but modified as needed for the orientation and motions of the fenestration system 1001.

Turning now to FIGS. 3A-8 another embodiment of a fenestration system is illustrated and described below. The fenestration system 300 of the embodiments of FIGS. 3A-8 may be used as the fenestration system 1. Thus, various components of the fenestration system 300 may be used as corresponding components of the fenestration system 1. The descriptions above of the components of the fenestration system 1 are also applicable to the corresponding components of the fenestration system 300, and thus duplicative descriptions of some aspects of the components of the fenestration system 300 may be omitted below. Corresponding components between the fenestration system 300 and fenestration system 1 may have reference labels that end in the same two right-most digits. For example, a closure element 320 and closure element 20 are corresponding components of the fenestration systems 300 and 1, respectively. In FIGS. 3A-8, some portions of the fenestration system 300 are shown, in particular those portions that include or are positioned near a magnetically actuatable seal device 360 (described further below), while other portions of the fenestration system 300 with which a person of ordinary skill in the art would be familiar (such as a frame like the frame 10 described above) are not shown.

Figure 3B:
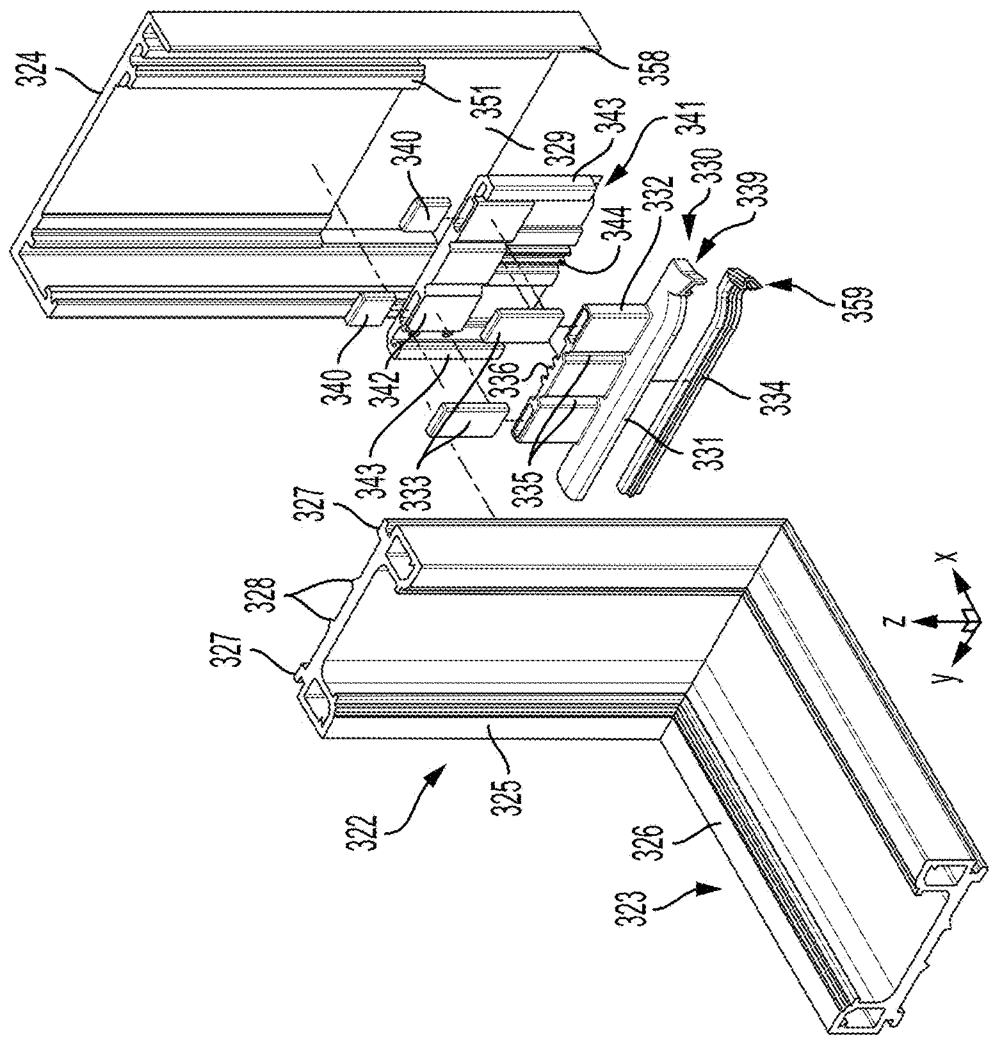
FIG. 3B is an exploded view of the portion of the embodiment of the fenestration system of FIG. 3A.
Figure 3A:
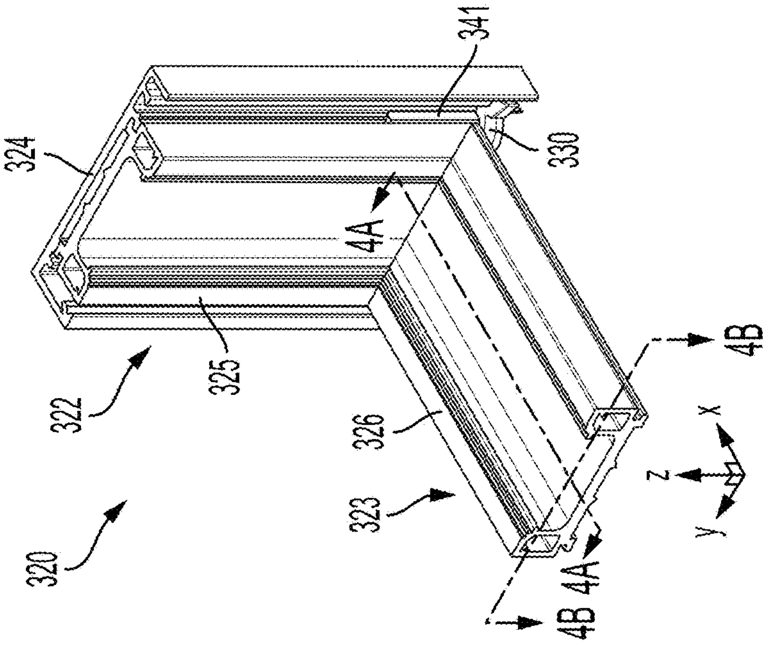
FIG. 3A is a cut-away perspective view of a portion of another embodiment of a fenestration system.
Figure 4B:
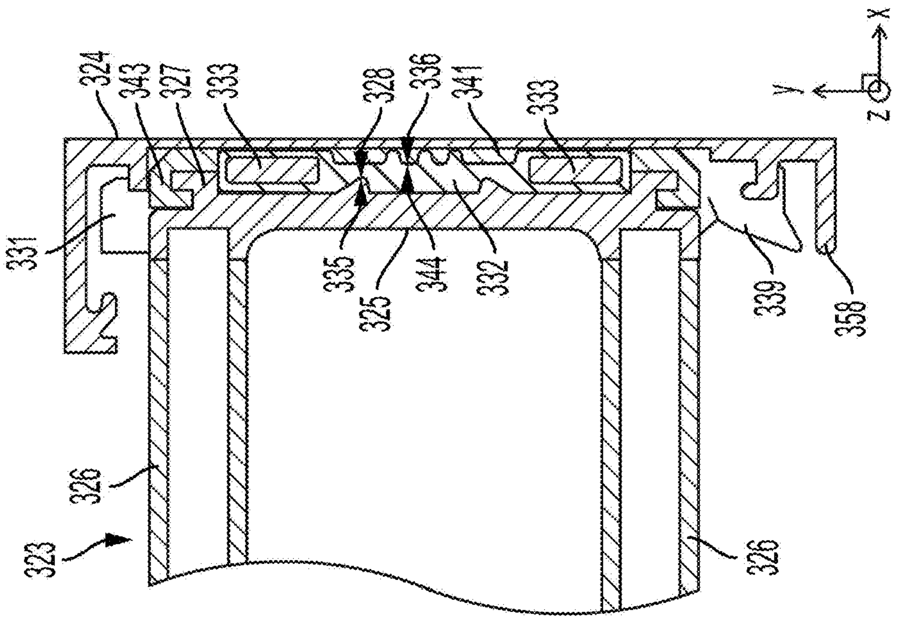
FIG. 4B is a cross-section of the fenestration system of FIG. 3A, with the section taken along 4B-4B.
Figure 4A:
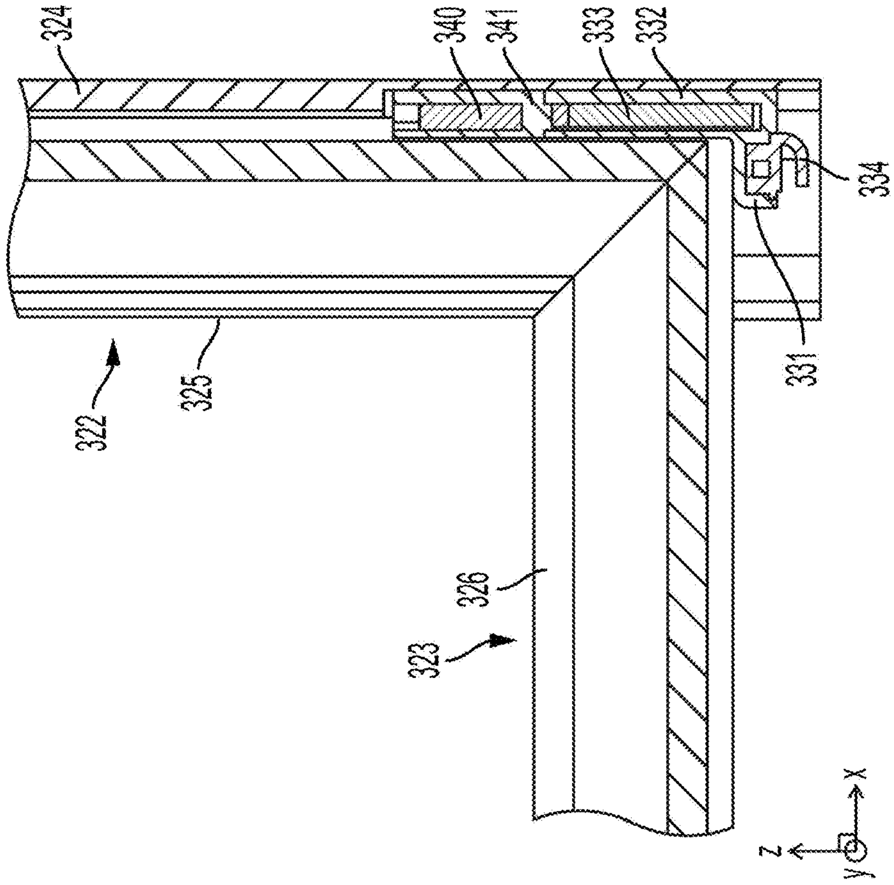
FIG. 4A is a cross-section of the fenestration system of FIG. 3A, with the section taken along 4A-4A.
Figure 8:
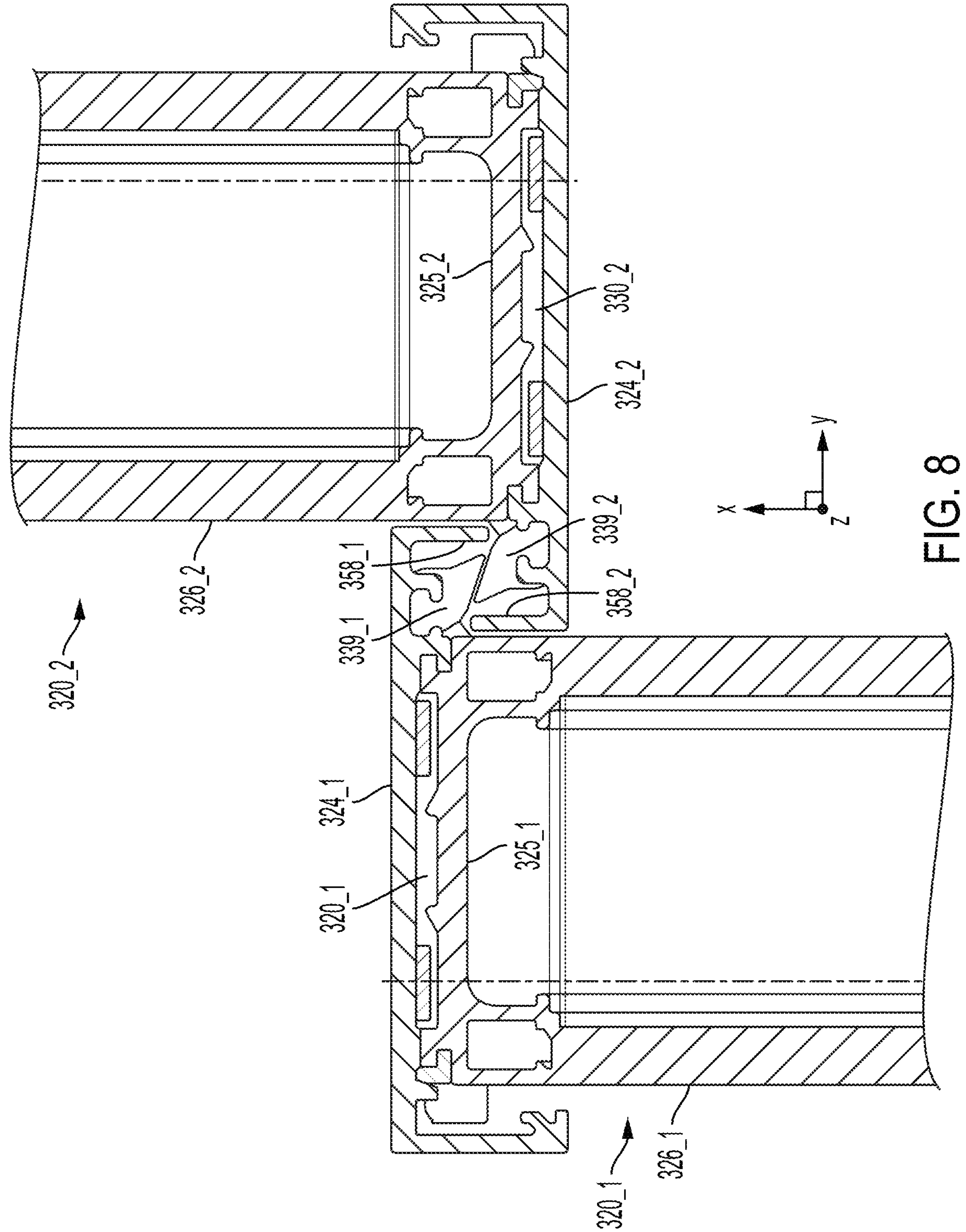
FIG. 8 is a top plan view of a portion of the fenestration system of FIGS. 3A-4B illustrating a state in which interlocks of two closure elements are engaged.

The fenestration system 300 comprises a closure element 320 and a magnetically actuatable seal device 360. Some parts of the closure element 320, such as a panels, facial elements, hardware, etc. are not illustrated in FIGS. 3A-8 to improve visibility of other elements in the drawings. FIG. 3A illustrates a perspective view of a portion of the closure element 320 near a corner thereof. FIG. 3B is an exploded view of the portion of the closure element 320 illustrated in FIG. 3A. FIGS. 4A and 4B are cross-sections of the portion of the closure element 320 illustrated in FIG. 3A taken along 4A-4A and 4B-4B, respectively. As shown in FIGS. 3A-4B, the closure element 320 comprises a rail 323 and a stile 322, as described above. The rail 323 comprises a support structure 326, which may be used as the support structure 26. The stile 322 comprises a support structure 325, which may be used as the support structure 25. Attached to the support structure 325 is an interlock feature 324, which may be used as the interlock feature 24 of the support structure 25. As shown in FIGS. 7A-7D, the interlock feature 324 may comprise an extension portion 358, which is to interact with a complementary interlock feature 324 of an adjacent closure element 320 to create a vertical seal between the adjacent closure elements 320. For example, the extension portion 358 may contact a weather strip (not illustrated) attached to the adjacent interlock feature 324 to create the seal. The interlock feature 324 may also comprise an attachment portion 351, which attaches to the interlock feature 324 to the support structure 326, as shown in FIGS. 3A and 8. The interlock feature 324 may also comprise a portion 352 which wraps around an edge of the closure element 320. The portion 352 may be provided, for example, for aesthetic purposes, e.g., to give the appearance that two interlock features 324 form one unified stile in a closed state of the closure elements 320. The portion 352 may also provide increased structural support. In some embodiments, the support structures 325 and 326 and the interlock feature 324 may be commercially available components, such as Schuco Gasket 224683 as one example.

Figure 5A:
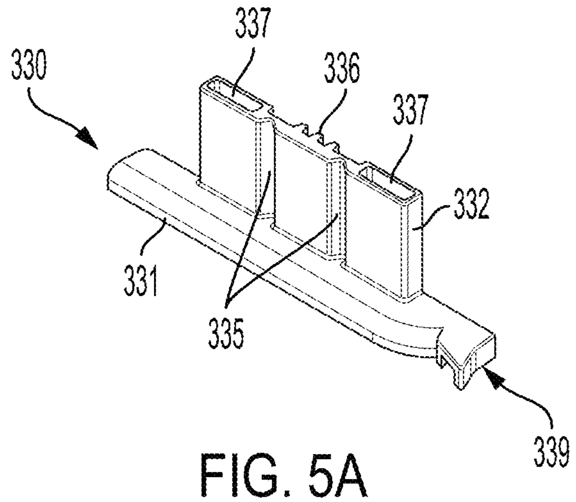
FIG. 5A is a perspective view of an embodiment of a carrier of a sealing system of the fenestration system of the embodiments of FIGS. 3A-4B.
Figure 5B:
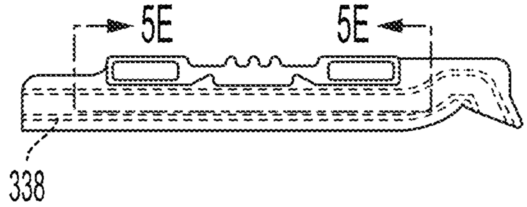
FIG. 5B is a top plan view of the carrier of FIG. 5A.
Figure 5C:
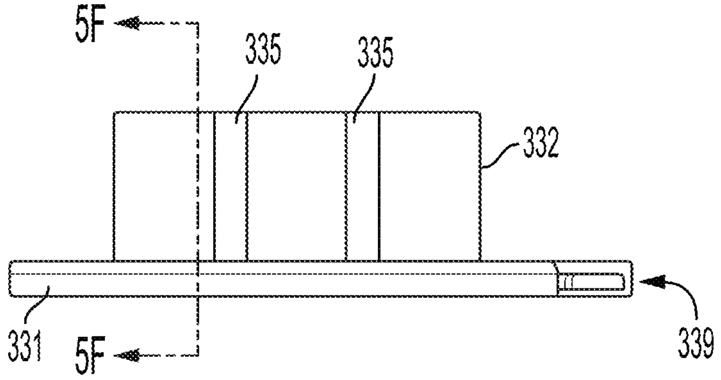
FIG. 5C is a front plan view of the carrier of FIG. 5A.
Figure 5D:
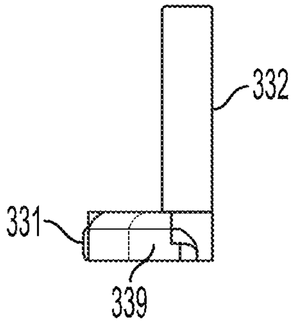
FIG. 5D is a side plan view of the carrier of FIG. 5A.
Figure 5E:
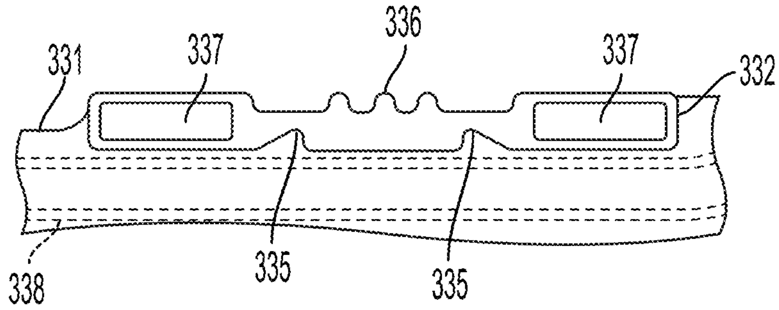
FIG. 5E is top plan view illustrating an enlarged detail 5E-5E of FIG. 5B.
Figure 5F:
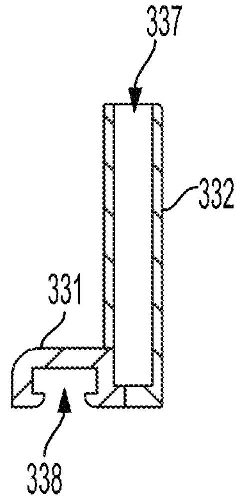
FIG. 5F is a cross-section of the carrier, with the section taken along 5F-5F in FIG. 5C.
Figure 6A:
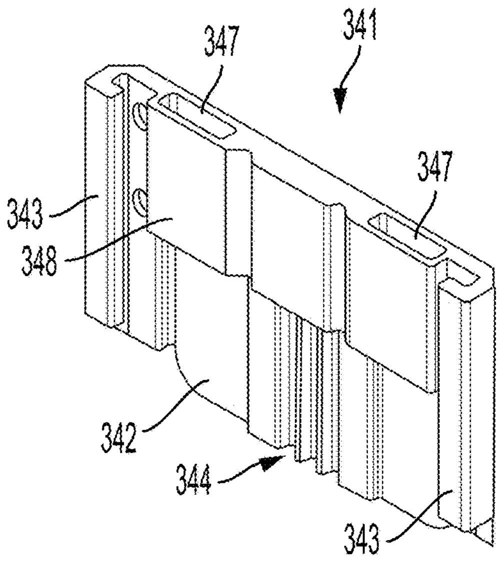
FIG. 6A is a perspective view of an embodiment of a carrier guide of the sealing system of FIGS. 3A-4B.
Figure 6B:
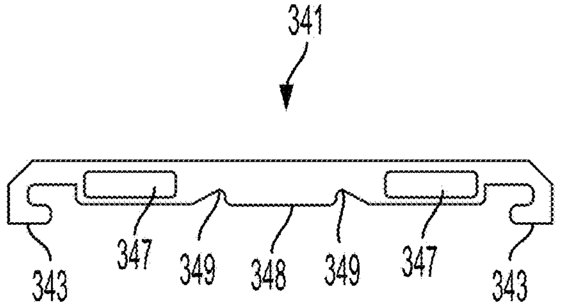
FIG. 6B is a top plan view of the carrier guide of FIG. 6A.
Figure 6C:
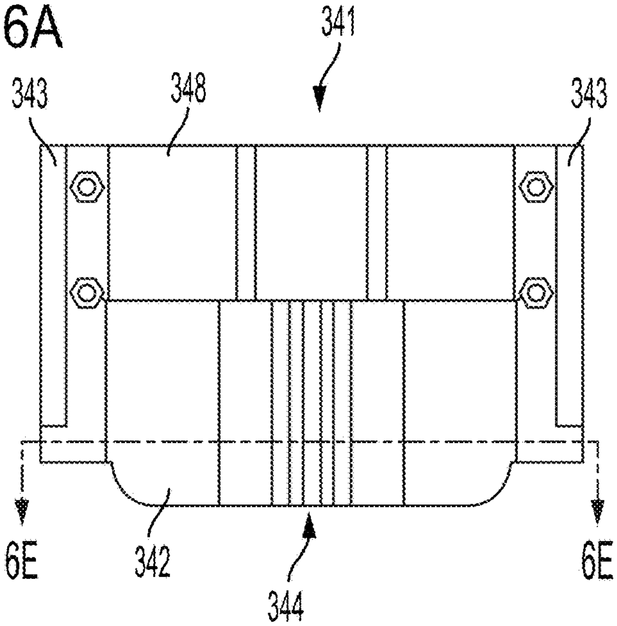
FIG. 6C is a front plan view of the carrier guide of FIG. 6A.
Figure 6D:
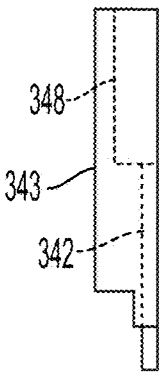
FIG. 6D is a side plan view of the carrier guide of FIG. 6A.
Figure 6E:
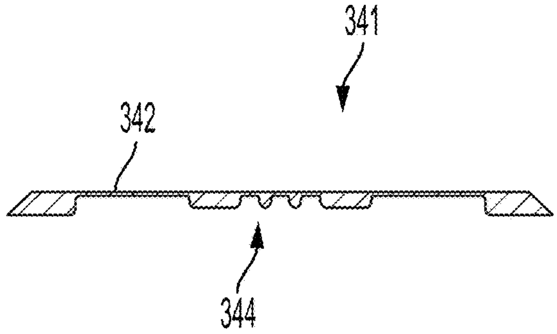
FIG. 6E is a cross-section of the carrier guide of FIG. 6A, with the section taken along 6E-6E in FIG. 6C.
Figure 7A:
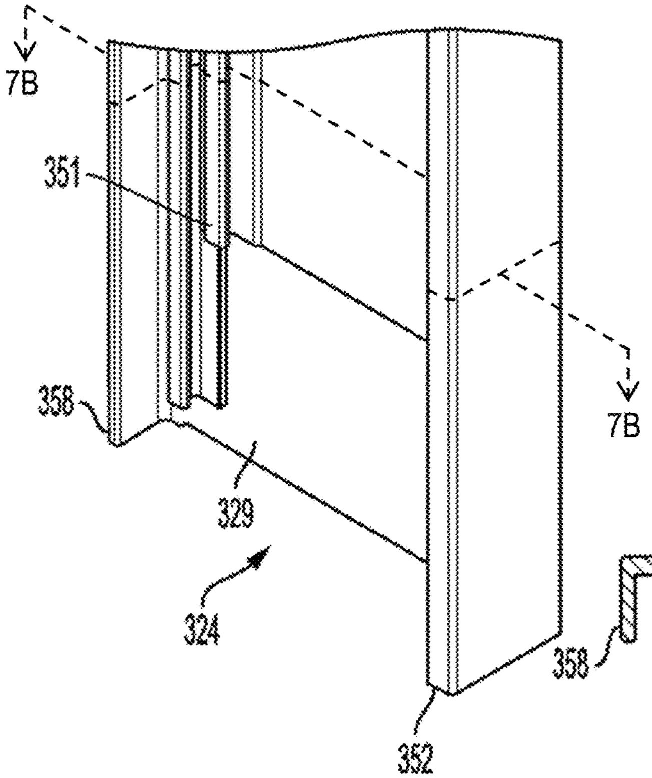
FIG. 7A is a perspective view of an embodiment of an interlock of the fenestration system of FIGS. 3A-4B.
Figure 7B:
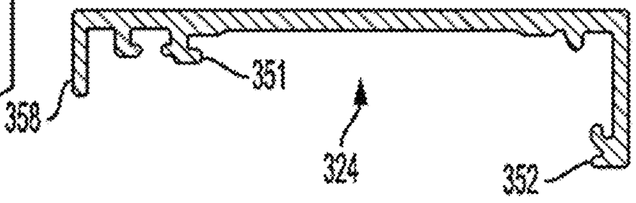
FIG. 7B is a cross-section of the interlock of FIG. 7A, with the section taken along 7B-7B in FIG. 7A.
Figure 7C:
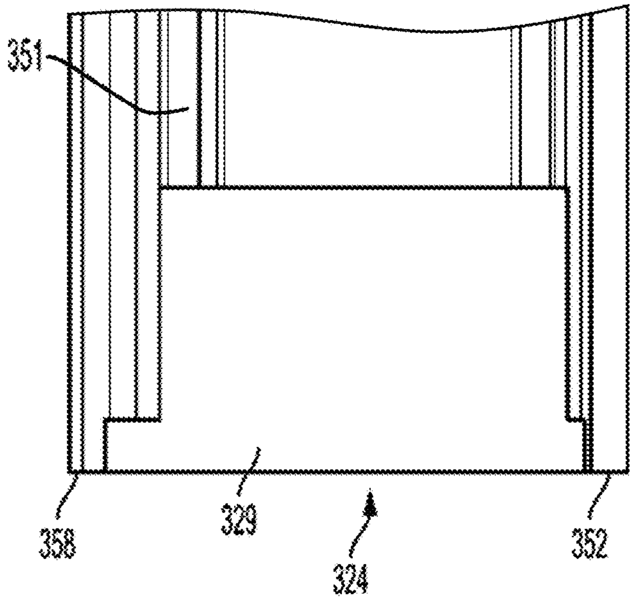
FIG. 7C is a front plan view of the interlock of FIG. 7A.
Figure 7D:
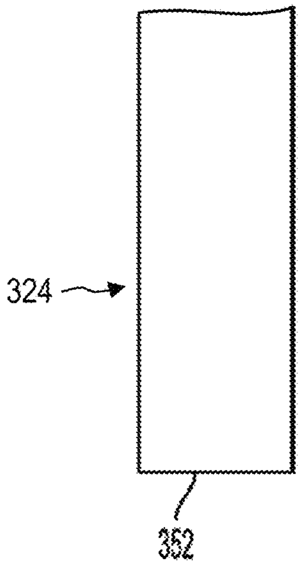
FIG. 7D is a side plan view of the interlock of FIG. 7A.

As shown in FIGS. 3A and 3B, the magnetically actuatable seal device 360 comprises a carrier 330 and a carrier guide 341, which may be used as the carrier 30 and carrier guide 41 described above. FIGS. 5A-5F illustrate the carrier 330 in isolation, while FIGS. 6A-6D illustrate the carrier guide 341 in isolation. As shown in FIGS. 3B and 5A-5F, the carrier 330 comprises a strip attachment portion 331. As shown in FIGS. 3B and 4A, the strip attachment portion 331 holds a weather strip 334. For example, the strip attachment portion 331 may comprise a slot 338 into which a portion of the weather strip 334 is inserted, as shown in FIGS. 4A, 5B, and 5F. The weather strip 334 may be, for example, a compliant (deformable) material, such as foam, rubber, vinyl, metal, felt (e.g., made from wool, cotton, polyester, etc.), plastic, a polymer, silicon, an array of aligned natural or synthetic fibers (like a brush), etc. In some embodiments, the weather strip 34 may be any commercially available weather strip, such as a Schuco P-shaped weather strip. etc. In some embodiments, the weather strip 334 may be any commercially available weather strip, such as a Schuco P-shaped weather strip. In some embodiments, the strip attachment portion 331 has a bend near one end thereof such that an end portion 339 of the strip attachment portion 331 extends in a different direction than the rest of the strip attachment portion 331, as shown in FIGS. 5A and 5B. This bend in the strip attachment portion 331 causes the weather strip 334 held by the strip attachment portion 331 to also have a bend and an end portion 359 that has a different orientation than a remainder of the weather strip 334. The end portion 359 is oriented so that it can interact with a complementary feature of an adjacent closure element 320, such as another end portion 359 of weather strip 334. Interaction between two end portions 359 is described in greater detail below with reference to FIG. 8.

As shown in FIGS. 3B and 5A-5F, the carrier 330 also comprises engagement portion 332, which extends from the strip attachment portion 331 along a z-axis direction. As shown in FIGS. 3B and 4A, the engagement portion 332 is positioned between the support structure 325 and the carrier guide 341. As shown in FIGS. 3B and 5A-5F, the engagement portion 332 comprises cavities 337 which hold carrier magnets 333. In the illustrated embodiment, two carrier magnets 333 are used, but in other embodiments any number of carrier magnets 333 may be used.

As shown in FIGS. 3B, 4A, and 4B, the carrier guide 341 is attached to the stile 322 and disposed in a space between the support structure 325 and the interlock feature 324, and the engagement portion 332 of the carrier 330 is disposed in a space between the support structure 325 and the carrier guide 341. As shown in FIGS. 3B, 5A, 5B, and 5E, the engagement portion 332 comprises first surface features 335 on one side thereof and second surface features 336 on an opposite side thereof. In the embodiment shown, the first and second surface features 335 and 336 comprise elongated protrusions (ridges) that extend along a z-axis direction and/or elongated recesses (valleys) that extend along a z-axis direction. As shown in FIGS. 3B and 4B, the first surface features 335 are complementary to surface features 328 of the support structure 325, and second surface features 336 are complementary to the surface features 344 of the carrier guide 341. When the engagement portion 332 of the carrier 330 is inserted between the support structure 325 and the carrier guide 341, the first and second surface features 335 and 336 engage with the complementary surface features 328 and 344, respectively, to constrain and guide movement of the carrier 330. The engagement between these complementary surface features 335, 336, 328, and 344 may help to ensure smooth motion of the carrier 330 along a line parallel to the z-axis, for example, by preventing the carrier 330 from rotating or tilting and becoming jammed. In some embodiments, other surface features or keying arrangements can be provided and the configuration shown in nonlimiting and exemplary only.

The carrier guide 341 is attached to the support structure 325. Specifically, as best seen in FIGS. 3B and 4B, the carrier guide 341 comprises attachment members 343 which are complementary to attachment members 327 of the support structure 325, and the attachment members 343 and attachment members 327 are engaged to attach the carrier guide 341 to the support structure 325. The attachment members 327 of the support structure 325 may also engage an attachment portion 351 of the interlock feature 324 to facilitate attachment of the interlock feature 324 to the support structure 325. Other attachment mechanisms may also be used, in addition to or in lieu of the attachment members 343, to secure the carrier guide 341 to the stile 322, such as mechanical fasteners (e.g., screws) or adhesives.

The carrier guide 341 comprises retraction magnets 340 positioned to pull the carrier towards the retracted positions. Specifically, as shown in FIGS. 3B and 6A-6D, the carrier guide 341 comprises cavities 347 that house the retraction magnets 340. The retraction magnets 340 may be aligned with the carrier magnets 333 and their polarities may be arranged such that the retraction magnets 340 attract the carrier magnets 333. The retraction magnets 340 and carrier magnets 333 may be used as the retraction magnets 40 and carrier magnets 33 described above. The fenestration system 300 may also comprise extension magnets (not illustrated) attached to a frame (not illustrated), as described above. In the embodiment of FIGS. 3A-8, two retraction magnets 340 and two carrier magnets 333 are provided, but in other embodiments other numbers of retraction and carrier magnets 340 and 333 could be used (one, two, or more) and the magnets could be placed in other positions besides those illustrated. The desired number and positioning of magnets may vary depending, for example, on the space constraints of the system, the strength of the magnets, the level of force needed to actuate the carrier 330, etc. In some embodiments, including the embodiment of FIGS. 3A-8, the retraction magnets 340, carrier magnets 333, and extension magnets (not illustrated) are arranged symmetrically about a centerline of the carrier 330, which may help to prevent tilting of the carrier 330 during actuation.

The carrier 330 and carrier guide 341 may be formed, for example, by additive manufacturing techniques (e.g., 3-D printing), injection molding, casting, machining, or any other techniques. The carrier 330 and carrier guide 341 may be formed from a solid material, such as a plastic or metal. In some embodiments, it may be beneficial for the materials of the carrier 330 and carrier guide 341 to exhibit relatively low friction and resilience to wear, as the carrier 330 may slide relative to the carrier guide 341 many times over its lifetime. In addition, it may be beneficial for the materials of the carrier and carrier guide to have properties that allow for high heat deflection and/or low moisture absorption depending on the conditions to which the fenestration system will be exposed. For example, in some embodiments, the carrier 330 and carrier guide 341 are formed from Polyethylene terephthalate glycol-modified (PETG), which exhibits relatively high heat deflection, low moisture absorption, and a smooth surface finish (which reduces friction). Other examples of materials for the carrier 330 and/or carrier guide 341 include Acrylonitrile butadiene styrene (ABS), Carbon fiber (CF), Glass Fiber (GF), Polyamide Nylon (PA), Nylon Polyamide plus Carbon Fiber (PA12CF), Polycarbonate (PC), Polypro-pylene (PP), and Thermoplastic polyurethane (TPU). As noted above, in some embodiments the carrier 330 may be a ferromagnetic material such as iron, steel, nickel, etc., in which case the carrier magnets 333 may be omitted. However, in some circumstances, using the carrier magnets 333 and forming the carrier 330 from non-ferromagnetic materials may be beneficial. For example, non-ferromagnetic materials may be well suited for certain manufacturing techniques, such as 3D printing, while more difficult or expensive manufacturing techniques may be needed when using ferromagnetic materials. As another example, some non-ferromagnetic materials may exhibit the beneficial qualities noted above, while ferromagnetic materials might not exhibit some or all of these qualities or exhibit them to a lesser degree.

As shown in FIGS. 3A, 4A, and 4B, the free space between the support structure 325 and the interlock feature 324 is relatively limited. In particular, the support structure 325 and the interlock feature 324 may be formed from commercially available components which are designed to be coupled together, and which generally do not have any other parts interposed therebetween. Accordingly, in some embodiments, the interlock feature 324 may be machined post-production to provide a recessed portion 329, as shown in FIGS. 3B and 7A-7D. This recessed portion 329 may provide for more room between the support structure 325 and the interlock feature 324. This may allow for the carrier 330 and carrier guide 341 to be positioned between the support structure 325 and the interlock feature 324 within the recessed portion 329. In some embodiments, the interlock feature 324 may be manufactured with the recessed portion 329 already included therein, thus avoiding the need for post-manufacture machining. In other embodiments, the support structure 325 and interlock feature 324 may be designed to have sufficient space therebetween to accommodate the carrier 330 without needing a recessed portion 329. In some embodiments, the carrier guide 341 may be omitted, the retraction magnets may be attached directly to the interlock feature 324 or the support structure 325, and the interlock feature 324 may be provided with surface features complementary to the surface features 336 to engage and guide movement of the carrier 330.

As shown in FIG. 8, in some embodiments, the fenestration system 300 comprises two closure elements 320_1 and 320_2 that each have magnetically actuatable seal devices 360. In FIG. 8 and the description herein, the numerical indexes "_1", "_2" are appended to the end of the reference numbers of some components to identify which closure element 320 the components are associated with—i.e., components with the index "_1" are associated with the closure element 320_1, while components with the index "_2" are associated with the closure element 320_2. However, when such components are being referred to generally or collectively without a need to distinguish between specific ones, the index may be omitted from the base reference number. The closure elements 320_1 and 320_2 each have complementary interlock features 324_1 and 324_2, carriers 330_1 and 330_2, and support structures 325_1, 325_2, 326_1, and 326_2, as described above. However, the parts of the closure element 320_1 may be arranged in an opposite and complementary fashion to those of the closure element 320_2, as shown in FIG. 8. Thus, when the two closure elements 320_1 and 320_2 are in their closed positions, the interlock features 324_1 and 324_2 interact to create a vertical seal. For example, the extension portion 358_1 may contact a weather strip (not illustrated) held by the interlock feature 324_2, and the extension portion 358_2 may contact a weather strip (not illustrated) held by the interlock feature 324_1. Similarly, the end portions 339_1 and 339_2 of the respective closure elements 320_1 and 320_1, which are at an oblique angle relative to the rest and the strip attachment portions 331, are configured such that the weather strips 334 attached thereto (not visible in FIG. 8) interact together to at least partially close a gap that would otherwise exist therebetween. In other words, the orientation of the end portions 339 is such that the ends of the weather strips 334 abut one another (or come close together) and thus prevent or reduce leakage through the region between the two weather strips 334.

Figure 9B:
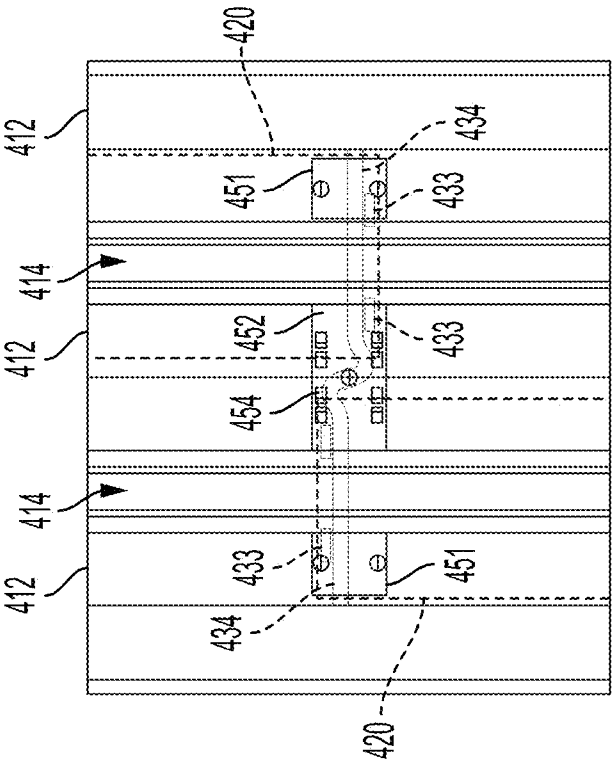
FIG. 9B is a top plan view of the frame of FIG. 9A.
Figure 9C:
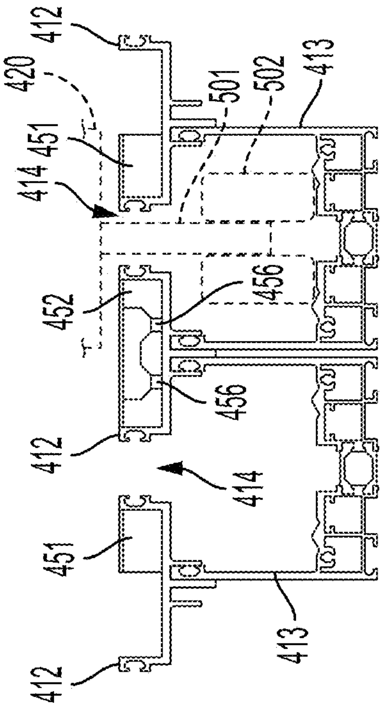
FIG. 9C is a front plan view of the frame of FIG. 9A.
Figure 9A:
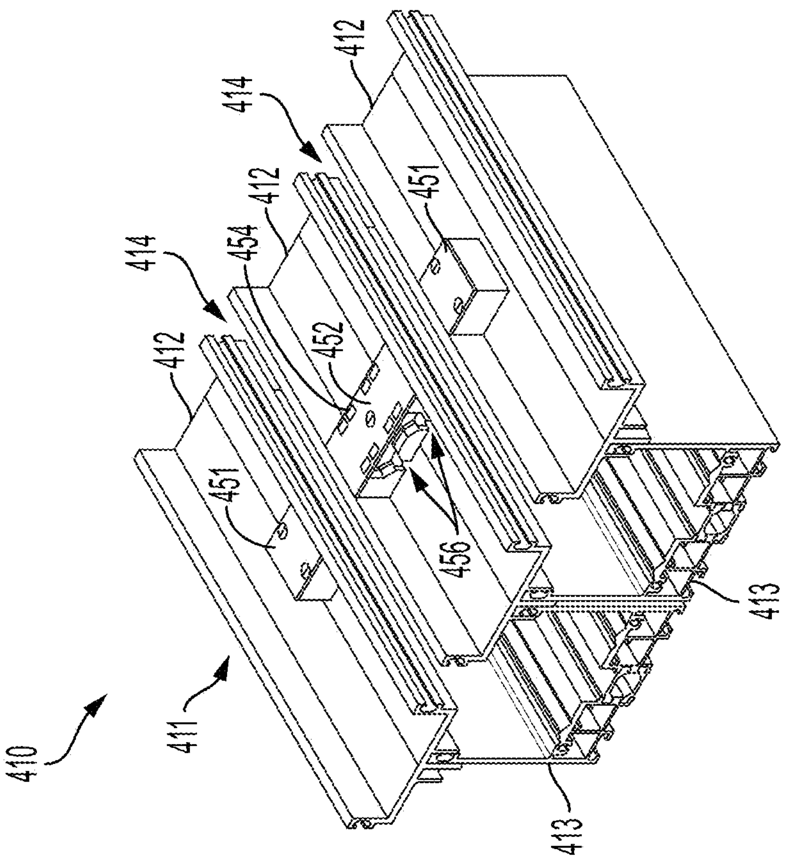
FIG. 9A is a perspective view of an embodiment of a frame of the fenestration system of FIGS. 3A-4B.
Figure 10:
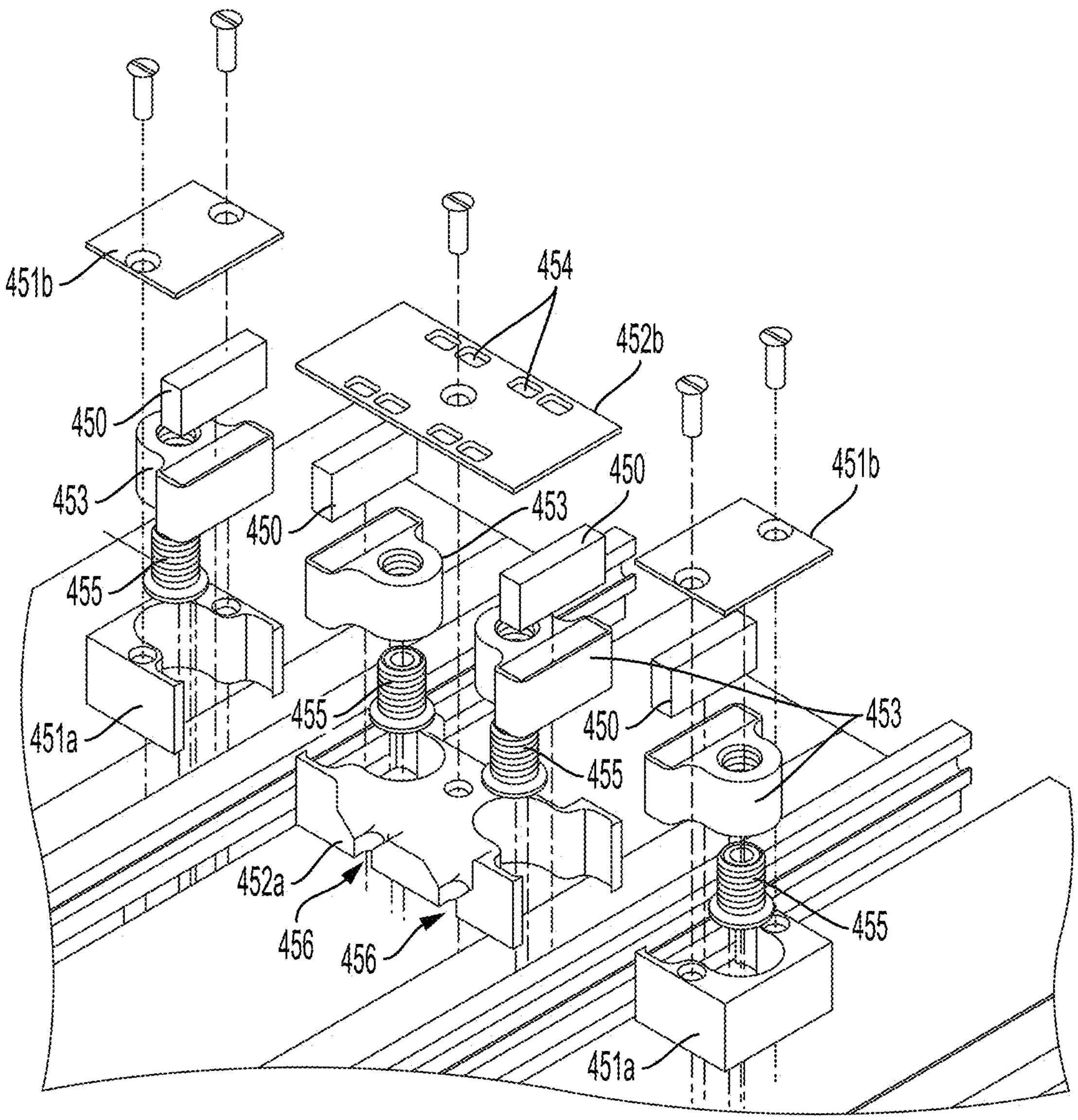
FIG. 10 is an exploded view of extension magnet housings of the frame of FIGS. 9A-9C.

Turning now to FIGS. 9A-10, an embodiment of a portion of another fenestration system will be described. Specifically, an arrangement of extension magnets 450 and extension magnet housings 451 and 452 will be described. The extension magnets 450 and extension magnet housings 451 and 452 may be used in any of the fenestration systems described above, such as the fenestration systems 1 and 300. An embodiment of a portion of a frame 410 is also illustrated in FIGS. 9A-10, and will be described in greater detail below following the description of the extension magnets 450 and extension magnet housings 451 and 452. The frame 410 may be used as the frame 10 described above. Only a portion of the frame 410 is illustrated in FIGS. 9A-10. In particular, FIGS. 9A-10 illustrate a portion of the frame 410 that is positioned adjacent to and interacts with one of the magnetically actuatable sealing devices disclosed herein (e.g., the magnetically actuatable sealing device 60 or 360). The illustrated portion of the frame 410 may be a horizontal portion (either a sill or a header) in embodiments in which the closure elements move horizontally (such as in FIGS. 1A and 2A), or the portion of the frame 410 may be a vertical portion in embodiments in which the closure elements move vertically (such as in FIG. 11).

As shown in FIG. 9A-10, extension magnet housings 451 and 452 may be attached to a frame 410 of a fenestration system, and extension magnets 450 may be housed within the extension magnet housings 451 and 452. The extension magnets 450 may be used as the extension magnets 50. As shown in FIG. 10, the extension magnet housings 451 may each house one extension magnet 450, while the extension magnet housing 452 may house two extension magnets 450. In other embodiments, different numbers and positions of extension magnet housings 451 and 452, as well as different numbers and arraignments of magnets 450 per housing 451 or 452, are contemplated, and the illustrated arrangement is a nonlimiting example. As shown in FIG. 9B, the extension magnet housings 451 and 452 are positioned such that the extension magnets 450 are directly below, or close to being directly below, the carrier magnets 433 (which may be used as the carrier magnets 33 or 333) of a closure element 420 (which may be used as the closure element 20 or 320) when the closure element 420 is in a closed position. Thus, the extension magnets 450 are able to actuate a carrier (e.g., carrier 30 or 330) of the closure element 420 into the extended position, as described above. FIG. 9B illustrates an approximate position of weather strips 434 attached to the carriers of the closure elements 420 when in the extended position. In some embodiments, the weather strips 434 may contact the extension magnet housings 451 and 452 when in the extended position.

In the embodiment of the frame 410 illustrated in FIGS. 9A-9C, there is a gap 414 that is positioned below the closure elements 420 (between adjacent channel members 412), as shown in FIGS. 9A-9C. These gaps 414 may prevent the extension magnets 450 from being positioned directly below the centerline of the carrier. Thus, the extension magnets 450 may need to be located offset from centerline of the carrier. Accordingly, to avoid torquing the carriers to one side, multiple carrier magnets 433 and multiple extension magnets 450 are provide for each closure element 420, and the magnets 433 and 450 are arranged symmetrically on both sides of the gap 414 so that the carriers are pulled down from two opposite sides. Thus, the extension magnet 450 of one extension magnet housing 451 and one of the extension magnets 450 of the extension magnet housing 452 are positioned to actuate a carrier (e.g., carrier 30 or 330) of one closure element 420, while the other extension magnets 450 are positioned to actuate a carrier of another adjacent closure element 420.

As shown in the exploded view of FIG. 10, the extension magnet housings 451 and 452 each comprise one or more magnet holders 453 and a shim 455. The magnet holders 453 each hold a magnet and the shim 455 engages threads in the magnet holder 453 such that turning the shim 455 changes the vertical position of the magnet 450 relative to the extension magnet housing 451. This allows for fine-tuning of the amount of force exerted by the magnet 450 on the carrier magnets 433 by changing the vertical location of the magnet 450 and hence the distance between the magnet 450 and the carrier magnet 433. The extension magnet housings 451 may comprise a base portion **451*a* and a lid portion 451*b* removably attached to the base portion 451*a*, for example by mechanical fasteners such as screws. Similarly, the extension magnet housings 452 may comprise a base portion 452*a* and a lid portion 452*b* removably attached to the base portion 452*a*. The base portions 451*a* and 452*a* may be attached to a frame (e.g., frame 10 or 410) via adhesives (e.g., epoxy) or mechanical fasteners (e.g., screws). In some embodiments, the extension magnet housings 451 and 452 and/or the magnet holders 453 may be manufactured using an additive manufacturing technique such as 3-D printing, for example from PETG or other plastics. In some embodiments, the extension magnet housings 451 and 452 and/or the magnet holders 453** may injection molded, cast, or machined.

As shown in FIGS. 9A, 9C, and 10 the magnet housing 452 may comprise drain channels 456 on one or more sides thereof. A lid portion **452*b* of the magnet housing 452 may have drain holes 454 disposed therein, as shown in FIGS. 9A, 9B, and 10. The drain channels 456 may be positioned below the drain holes 454, such that water, dust, and other fine particles can be drained away from the top of the lid portion 452*b* down into the region below the magnet housing 452. For example, when the extension magnet housing 452 is installed in the frame 410 as shown in FIGS. 9A-9C, the water or other material may drain down into a channel member 412** (described below), which may be designed to receive and handle such drainage.

As noted above, FIGS. 9A-9C also illustrate an embodiment of a frame 410, which may be used as the frame 10 described above. The frame 410 may be used in any of the fenestration systems described herein. Although the extension magnets 450 and extension magnet housings 451 and 452 are illustrated in FIGS. 9A-9C as being installed in the frame 410, it should be understood that the extension magnets 450 and extension magnet housings 451 and 452 could be installed in other frames as well. In FIGS. 9A-9C, a sill or threshold portion 411 of the frame 410 is illustrated. In this embodiment, the sill or threshold portion 411 comprises three sill channel members 412. The sill channel members 412 are each designed to hold therein a strip of material (not illustrated) that forms a top surface of the sill or threshold portion 411, such as a wood sill plate, aluminum sill plate, or the like. In some embodiments, the top surface of the material held in the sill channel members 412 may be level with an adjacent floor, thus avoiding a raised sill/threshold. The sill channel members 412 are attached to recessed rail members 413. Each of the recessed rail members 413 defines a space that houses bearing devices 502, such as wheels, which are attached to a closure element 420 (one set of bearing devices 502 and one closure element 420 are shown in dashed lines in FIG. 9C). Supports 501 may extend from the bearing devices 502 within the space defined by the recessed rail members 413 to the closure element 420 located above the sill portion 411 via the gaps 414, thus coupling the closure element 420 to the bearing devices 502. This mechanism may beneficially allow the bearing device 502 to be hidden below floor level, which may allow for a bottom rail of the closure element 420 to be thinner and positioned lower in the opening.

This description and the accompanying drawings that illustrate various aspects and embodiments of the presently disclosed inventions should not be taken as limiting—the claims define the scope of protection. Various mechanical, compositional, structural, and operational changes may be made without departing from the spirit and scope of this description and the claims. In some instances, well-known structures and techniques have not been shown or described in detail in order not to obscure the present disclosure. Like numbers in two or more figures represent the same or similar elements.

Further, the terminology used herein to describe aspects of the invention, such as spatial and relational terms, is chosen to aid the reader in understanding embodiments of the invention but is not intended to limit the invention. For example, spatially relative and/or directional terms—such as “horizontal”, “vertical”, “beneath”, “below”, “lower”, “above”, “upper”, “up”, “down”, and the like—may be used herein to describe positions, directions, and/or spatial relationships between elements or features as illustrated in the figures. These spatial/directional terms are used relative to the poses illustrated in the figures, and are not limited to a particular reference frame in the real world. Thus, for example, the direction “up” in the figures does not necessarily have to correspond to an “up” in a world reference frame (e.g., away from the Earth’s surface). Furthermore, if a different reference frame is considered than the one illustrated in the figures, then the spatial terms used herein may need to be interpreted differently in that different reference frame. For example, the direction referred to as “up” in relation to one of the figures may correspond to a direction that is called “down” in relation to a different reference frame that is rotated 180 degrees from the figure’s reference frame. As another example, if a device is turned over 180 degrees in a world reference frame as compared to how it was illustrated in the figures, then an item described herein as being “above” or “over” a second item in relation to the Figures would be “below” or “beneath” the second item in relation to the world reference frame. Thus, the same spatial relationship or direction can be described using different spatial terms depending on which reference frame is being considered. Moreover, the poses of items illustrated in the figure are chosen for convenience of illustration and description, but in an implementation in practice the items may be posed differently.

The term “horizontal” refers to a direction parallel to the rails of the closure element. In the Figures, a horizontal direction is parallel to the x-axis.

The term “vertical” refers to a direction perpendicular to the horizontal direction. In the Figures, a vertical direction is parallel to the z-axis. Vertical directions include an “upward” direction and an “downward” direction, which point in opposite directions. As used herein, an “upward” direction is a vertical direction pointing in the positive z-axis direction illustrated in the figures, while a “downward” direction is a vertical direction pointing in the negative z-axis direction.

When referring to directions along an axis, such as an x-axis, y-axis, or z-axis, the direction is intended to cover movement in both directions, one at a time, unless stated otherwise as being in a particular direction (positive or negative) along the axis.

In addition, the singular forms “a”, “an”, and “the” are intended to include the plural forms as well, unless the context indicates otherwise. And the terms “comprises”, “comprising”, “includes”, and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A fenestration system, comprising:

a closure element movable in translation relative to a frame between an open position and a closed position, the frame configured to surround a fenestration opening in a building structure, the closure element comprising a stile with a longitudinal dimension extending substantially perpendicular to a direction of translational movement of the closure element relative to the frame;

a carrier mounted to the stile of the closure element and movable relative to the closure element along the longitudinal dimension of the stile between an extended position and a retracted position;

a weather strip attached to the carrier and arranged to contact the frame in the extended position of the carrier;

one or more retraction magnets arranged to exert a first magnetic force on the carrier to move the carrier into the retracted position in the open position of the closure element; and one or more extension magnets arranged to exert a second magnetic force on the carrier to move the carrier into the extended position in the closed position of the closure element.

2. The fenestration system of claim 1, wherein the closure element is a door or a window.

3. The fenestration system of claim 1, wherein:

the stile comprises a support structure and an interlock feature;

the interlock feature is arranged to interact with a complementary interlock feature of a second closure element in the closed position of the closure element; and the carrier is positioned between the support structure and the interlock feature.

4. The fenestration system of claim 3, further comprising:

a carrier guide attached to the stile, wherein the carrier is movable relative to the carrier guide; and the carrier guide is engaged with the carrier to guide movement of the carrier.

5. The fenestration system of claim 4, wherein the one or more retraction magnets are attached to the carrier guide.

6. The fenestration system of claim 4, wherein:

the carrier guide is attached to the interlock feature;

the carrier is positioned between the support structure and the carrier guide; and the carrier comprises surface features complementary to and engaged with surface features of one or both of the carrier guide and the support structure to constrain movement of the carrier to movement along the longitudinal dimension of the stile.

7. The fenestration system of claim 1, wherein:

the weather strip extends along a first direction, the first direction is substantially perpendicular to the longitudinal dimension of the stile, and the first direction is substantially perpendicular to the direction of translational movement of the closure element.

8. The fenestration system of claim 1, wherein:

the weather strip contacts the frame in the extended position of the carrier, and the weather strip is spaced from the frame in the retracted position of the carrier.

9. The fenestration system of claim 1, further comprising:

one or more carrier magnets attached to the carrier, wherein the one or more retraction magnets exert the first magnetic force on the one or more carrier magnets; and the one or more extension magnets exert the second magnetic force on the one or more carrier magnets.

10. The fenestration system of claim 1, wherein:

the carrier comprises a strip attachment portion configured to hold the weather strip and an engagement portion configured to movably engage with the closure element, and the strip attachment portion is configured to cause an end portion of the weather strip to have a different orientation than a remainder of the weather strip.

11. The fenestration system of claim 1, wherein:

the carrier comprises a strip attachment portion configured to hold the weather strip and an engagement portion configured to movably engage with the closure element, and the engagement portion comprises one or more carrier magnets arranged to interact with the one or more retraction magnets and the one or more extension magnets to move the carrier between the extended and retracted positions.

12. A fenestration system, comprising:

a closure element comprising a first support and a second support extending perpendicular to each other, the closure element movable in translation relative to a frame along a longitudinal dimension of the first support, the frame configured to surround a fenestration opening between an open position and a closed position;

a carrier mounted to the second support and movable along a longitudinal dimension of the second support between an extended position and a retracted position;

a weather strip attached to the carrier and arranged to contact the frame when the carrier is in the extended position; and an actuator configured to move the carrier into the retracted position in the open position of the closure element and configured to move the carrier into the extended position in the closed position of the closure element.

13. The fenestration system of claim 12, wherein the actuator comprises:

one or more extension magnets arranged to exert a magnetic force on the carrier to move the carrier into the extended position in the closed position of the closure element; and one or more one or more retraction devices arranged to move the carrier into the retracted position in the open position of the closure element.

14. The fenestration system of claim 13, wherein the one or more retraction devices comprise one or more magnets.

15. The fenestration system of claim 13, wherein the one or more retraction devices comprise one or more springs.

16. The fenestration system of claim 13, wherein the weather strip extends transverse to a direction of translational movement of the closure element.

17. The fenestration system of claim 12, wherein:

the closure element is a first closure element and the system further comprises a second closure element;

the second support comprises a support structure and an interlock feature;

the interlock feature is arranged to interact with a complementary interlock feature of the second closure element in the closed position of the first closure element; and the carrier is positioned between the support structure and the interlock feature.

18. The fenestration system of claim 17, further comprising:

a carrier guide attached to the second support, wherein the carrier is engaged with and movable relative to the carrier guide; and the carrier guide is configured to guide movement of the carrier.

19. The fenestration system of claim 18, wherein:

the carrier guide is attached to the interlock feature;

the carrier is positioned between the support structure and the carrier guide; and the carrier comprises first surface features that are complementary to and engaged with second surface features of one or both of the carrier guide and the support structure to constrain movement of the carrier along the second support.

20. The fenestration system of claim 12, wherein:

the carrier comprises a strip attachment portion configured to hold the weather strip and an engagement portion configured to movably engage the closure element, and the strip attachment portion comprises a bend configured to hold an end portion of the weather strip at a different orientation than a remainder of the weather strip.

21. A method of operating a fenestration system, comprising:

in response to a closure element of the fenestration system being moved in translation, relative to a frame of the fenestration system, to a closed position, magnetically actuating a carrier mounted to a stile of the closure element to an extended position relative to the closure element, the stile having a longitudinal dimension extending substantially perpendicular to a direction of translational movement of the closure element relative to the frame, and in response to the closure element being moved in translation relative to the frame to an open position, magnetically actuating the carrier to a retracted position relative to the closure element, wherein a weather strip is attached to the carrier and is in contact with the frame in the extended position of the carrier and spaced from the frame in the retracted position of the carrier, and wherein actuating the carrier to the extended position and actuating the carrier to the retracted position comprise moving the carrier relative to the closure element along the longitudinal dimension of the stile.

22. A method of manufacturing a fenestration system, comprising:

mounting a carrier to a stile of a closure element such that the carrier is movable relative to the closure element along a longitudinal dimension of the stile between an extended position and a retracted position, wherein the closure element is movable in translation relative to a frame of the fenestration system and the longitudinal dimension of the stile extends substantially perpendicular to a direction of translational movement of the closure element relative to the frame;

mounting one or more retraction magnets to the closure element such that the one or more retraction magnets exert a first magnetic force on the carrier to move the carrier into the retracted position in an open position of the closure element; and mounting one or more extension magnets to the frame of the fenestration system such that the one or more extension magnets exert a second magnetic force on the carrier to move the carrier into the extended position in a closed position of the closure element, wherein a weather strip is attached to the carrier and is in contact with the frame in the extended position of the carrier and spaced from the frame in the retracted position of the carrier.

* * * * *